United States Patent
Abe et al.

(10) Patent No.: US 11,148,971 B2
(45) Date of Patent: Oct. 19, 2021

(54) METHOD FOR MANUFACTURING GLASS PANEL UNIT, METHOD FOR MANUFACTURING BUILDING COMPONENT, AND GAS ADSORPTION UNIT

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Tasuku Ishibashi, Ishikawa (JP); Masataka Nonaka, Osaka (JP); Takeshi Shimizu, Toyama (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 16/625,559

(22) PCT Filed: Jun. 19, 2018

(86) PCT No.: PCT/JP2018/023215
§ 371 (c)(1),
(2) Date: Dec. 20, 2019

(87) PCT Pub. No.: WO2019/003998
PCT Pub. Date: Jan. 3, 2019

(65) Prior Publication Data
US 2021/0238088 A1    Aug. 5, 2021

(30) Foreign Application Priority Data
Jun. 30, 2017    (JP) .............................. JP2017-129893

(51) Int. Cl.
*E06B 3/677*    (2006.01)
*C03C 27/10*    (2006.01)
(Continued)

(52) U.S. Cl.
CPC ............ *C03C 27/10* (2013.01); *E06B 3/6612* (2013.01); *E06B 3/66304* (2013.01); *E06B 3/673* (2013.01);
(Continued)

(58) Field of Classification Search
CPC ........ E06B 3/677; E06B 3/673; E06B 3/6736; E06B 3/6775
See application file for complete search history.

(56) References Cited

U.S. PATENT DOCUMENTS

| 5,191,980 A | 3/1993 | Boffito et al. |
| 6,420,002 B1 | 7/2002 | Aggas et al. |

(Continued)

FOREIGN PATENT DOCUMENTS

| CN | 1621653 A | 6/2005 |
| JP | H05-254588 A | 10/1993 |

(Continued)

OTHER PUBLICATIONS

International Search Report and Written Opinion issued in International Patent Application No. PCT/JP2018/023215 dated Aug. 28, 2018; with partial English translation.

*Primary Examiner* — Donald J Loney
(74) *Attorney, Agent, or Firm* — McDermott Will and Emery LLP

(57) ABSTRACT

A gas adsorption unit includes a getter, a package encapsulating the getter, and a low-melting member. The low-melting member is heated, and thereby melted, at a temperature lower than a melting point of the package to bond a connector including the low-melting member onto the package. Next, the low-melting member that has melted is cooled and cured. Then, thermal stress resulting from a difference in thermal expansion coefficient between the
(Continued)

package and the connector is caused to the package connected to the connector, thereby breaking the package open.

18 Claims, 19 Drawing Sheets

(51) Int. Cl.
*E06B 3/66* (2006.01)
*E06B 3/663* (2006.01)
*E06B 3/673* (2006.01)

(52) U.S. Cl.
CPC ............ *E06B 3/677* (2013.01); *E06B 3/6736* (2013.01); *E06B 3/6775* (2013.01); *E06B 2003/66338* (2013.01)

(56) References Cited

U.S. PATENT DOCUMENTS

| | | | | |
|---|---|---|---|---|
| 2006/0187608 | A1* | 8/2006 | Stark | H01L 23/10 361/202 |
| 2009/0155500 | A1* | 6/2009 | Cooper | E06B 3/677 428/34 |
| 2018/0320436 | A1 | 11/2018 | Abe et al. | |

FOREIGN PATENT DOCUMENTS

| | | |
|---|---|---|
| JP | 2010-227920 A | 10/2010 |
| JP | 2016-108799 A | 6/2016 |
| WO | 2017/056422 A1 | 4/2017 |

\* cited by examiner

METHOD FOR MANUFACTURING GLASS PANEL UNIT, METHOD FOR MANUFACTURING BUILDING COMPONENT, AND GAS ADSORPTION UNIT

CROSS-REFERENCE OF RELATED APPLICATIONS

This application is the U.S. National Phase under 35 U.S.C. § 371 of International Patent Application No. PCT/JP2018/023215, filed on Jun. 19, 2018, which in turn claims the benefit of Japanese Application No. 2017-129893, filed on Jun. 30, 2017, the entire disclosures of which Applications are incorporated by reference herein.

TECHNICAL FIELD

The present invention relates to a method for manufacturing a glass panel unit, a method for manufacturing a building component, and a gas adsorption unit.

BACKGROUND ART

Patent Literature 1 discloses a method for manufacturing a glass panel unit having a vacuum gap created between a pair of glass panes. According to this manufacturing method, a first glass substrate and a second glass substrate are arranged to face each other with a frame-shaped material interposed between them, and then the frame-shaped material is heated and melted to hermetically bond the first and second glass substrates together. Next, an internal space created between the first and second glass substrates is evacuated to turn into a vacuum gap. Thereafter, the vacuum gap is hermetically closed up to obtain a work in progress. The work in progress is then partially cut out to obtain a glass panel unit.

In the vacuum gap of the glass panel unit, arranged is a gas adsorption unit for adsorbing a gas emitted from the frame-shaped material, for example. The gas adsorption unit includes zeolite as a getter. When heated while the internal space is evacuated during the manufacturing process, the getter is activated to adsorb the gas emitted from the frame-shaped material and other members.

The manufacturing method described above requires an activating process for heating the getter to a temperature equal to or higher than its activation temperature, thus often limiting the types of usable getters depending on, for example, the temperature when the internal space is evacuated. Setting the temperature to evacuate the internal space at a high temperature makes a getter with a high activation temperature usable. This in turn makes it difficult to save energy.

CITATION LIST

Patent Literature

Patent Literature 1: JP 2016-108799 A

SUMMARY OF INVENTION

In view of the foregoing background, it is therefore an object of the present invention to provide a method for manufacturing a glass panel unit, a method for manufacturing a building component, and a gas adsorption unit, all of which are configured or designed to efficiently adsorb, after an evacuating and hermetically sealing step, a gas emitted in the internal space without performing the step of activating a getter.

To achieve this object, a method for manufacturing a glass panel unit according to an aspect of the present invention includes an arrangement step, a bonding step, and an evacuating and hermetically sealing step. The arrangement step includes arranging a first substrate, including a glass pane, and a second substrate, including another glass pane, such that the first substrate and the second substrate face each other with a frame-shaped sealing material interposed between the first and second substrates, and thereby creating an internal space surrounded with the first substrate, the second substrate, and the sealing material. The bonding step includes heating a glass composite, including the first substrate, the second substrate, and the sealing material, to melt the sealing material and thereby hermetically bond the first substrate and the second substrate together with the sealing material thus melted. The evacuating and hermetically sealing step includes evacuating and hermetically sealing the internal space. The arrangement step further includes arranging a gas adsorption unit inside of the frame-shaped sealing material. The gas adsorption unit includes a getter, a package, and a low-melting member. The getter has been activated. The package encapsulates the getter therein. The low-melting member has a lower melting point than the package. The method for manufacturing a glass panel unit further includes a melting step, a curing step, and a seal opening step. The melting step includes heating, and thereby melting, the low-melting member at a temperature lower than a melting point of the package to bond a connector including the low-melting member onto the package. The curing step includes cooling and thereby curing, after the bonding step, the low-melting member that has melted in the melting step. The seal opening step includes causing, either during, or after, the evacuating and hermetically sealing step, thermal stress resulting from a difference in thermal expansion coefficient between the package and the connector to the package connected to the connector and breaking the package open with the thermal stress to open a seal of the getter by the package.

A method for manufacturing a building component according to another aspect of the present invention includes a fitting step of fitting a building component frame onto a glass panel unit manufactured by the method for manufacturing a glass panel unit described above.

A gas adsorption unit according to still another aspect of the present invention includes a getter, a package, and a low-melting member. The getter has been activated. The package encapsulates the getter. The low-melting member is arranged along an outer surface of the package and has a lower melting point than the package.

DESCRIPTION OF EMBODIMENTS

An exemplary embodiment and variations thereof to be described below relate to a method for manufacturing a glass panel unit in which an evacuated space is created between a pair of glass panes, a method for manufacturing a building component including the glass panel unit, and a gas adsorption unit to be used effectively in these manufacturing methods.

Glass Panel Unit

Figure 1:
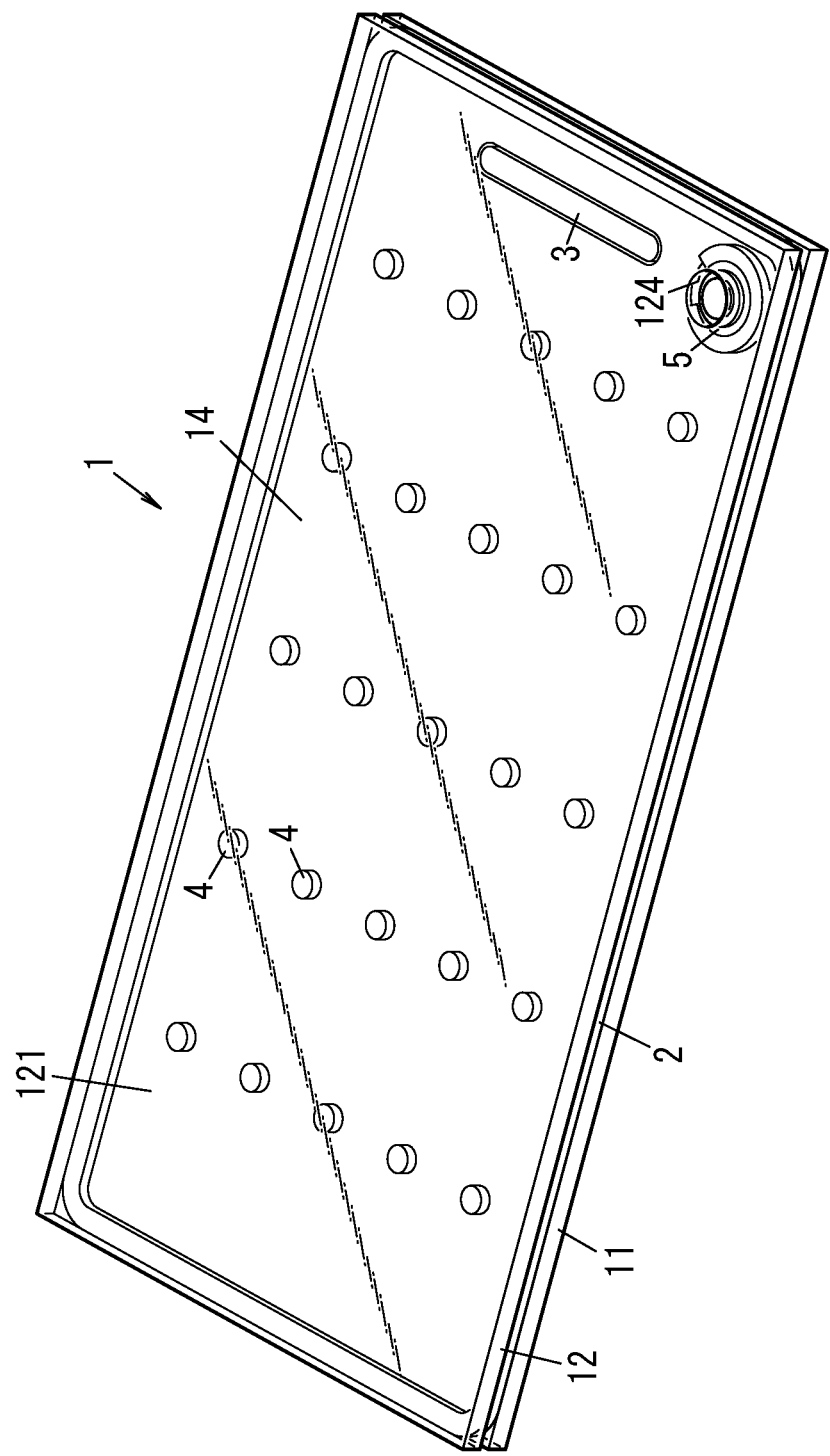
FIG. 1 is a perspective view of a glass panel unit according to an exemplary embodiment of the present invention.
Figure 2:
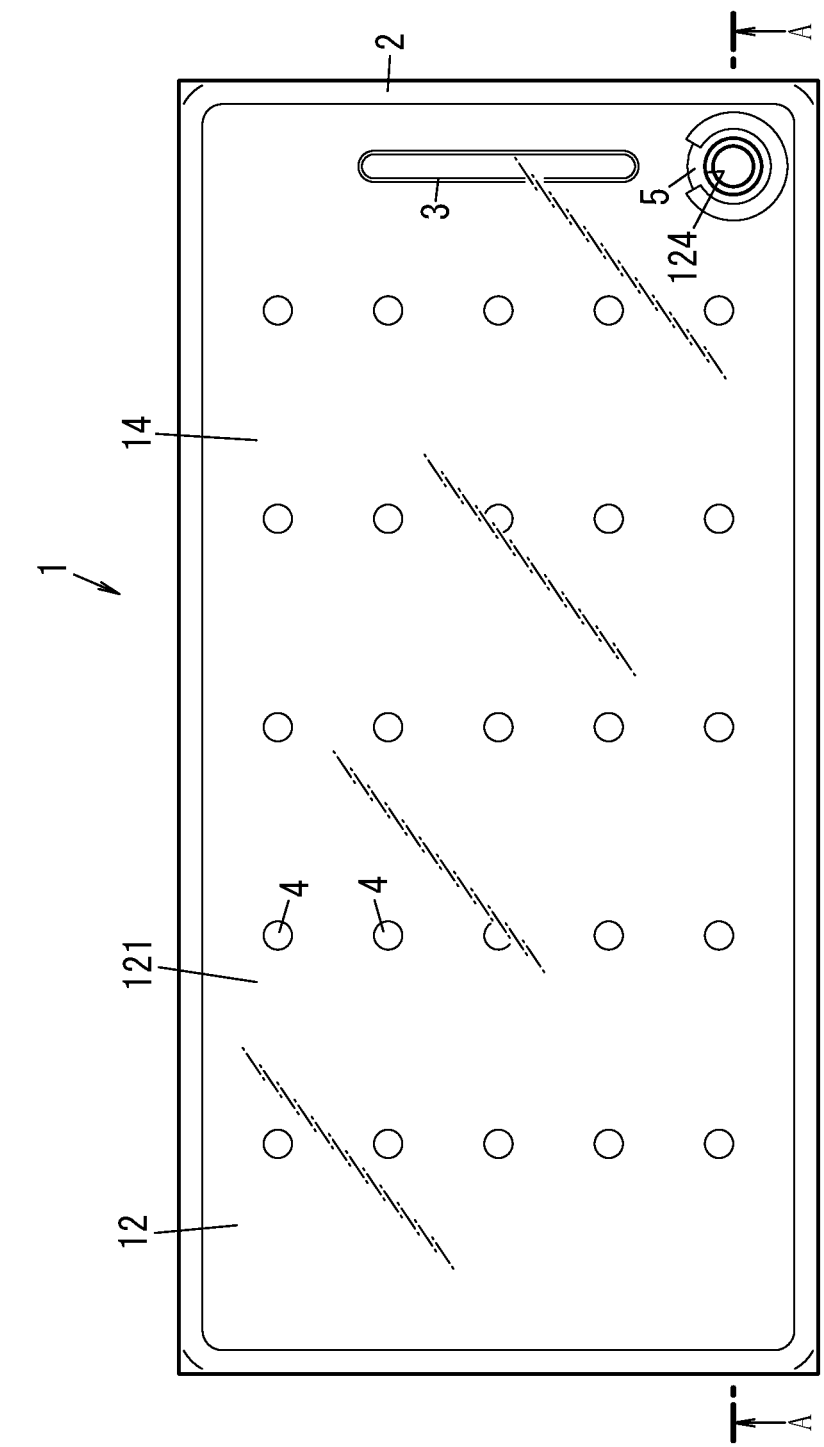
FIG. 2 is a plan view of the glass panel unit.
Figure 3:
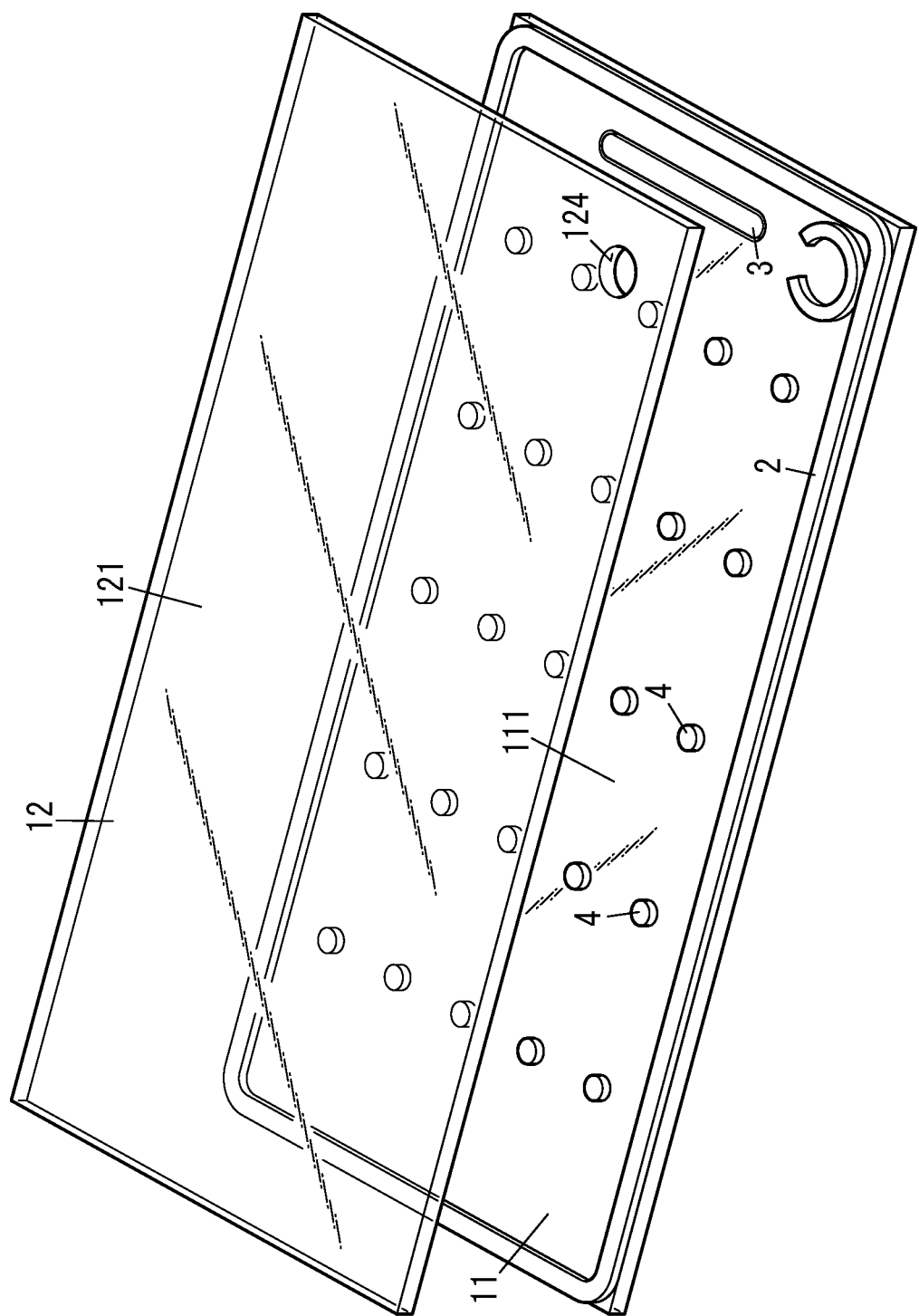
FIG. 3 is an exploded perspective view of the glass panel unit.

As shown in FIGS. 1-3, a glass panel unit 1 according to this exemplary embodiment includes a first substrate 11, a second substrate 12, a sealing portion 2, a gas adsorption unit 3, a plurality of (or multiple) pillars 4, and a hermetically sealing portion 5.

Each of the first substrate 11 and the second substrate 12 according to this embodiment is formed in the shape of a rectangular plate. The first substrate 11 and the second substrate 12 are arranged to face each other with a gap left between them along the thickness of the first substrate 11. The first substrate 11 and the second substrate 12 are parallel to each other. Between the first substrate 11 and the second substrate 12, arranged are the sealing portion 2 and the plurality of pillars 4.

Figure 4:
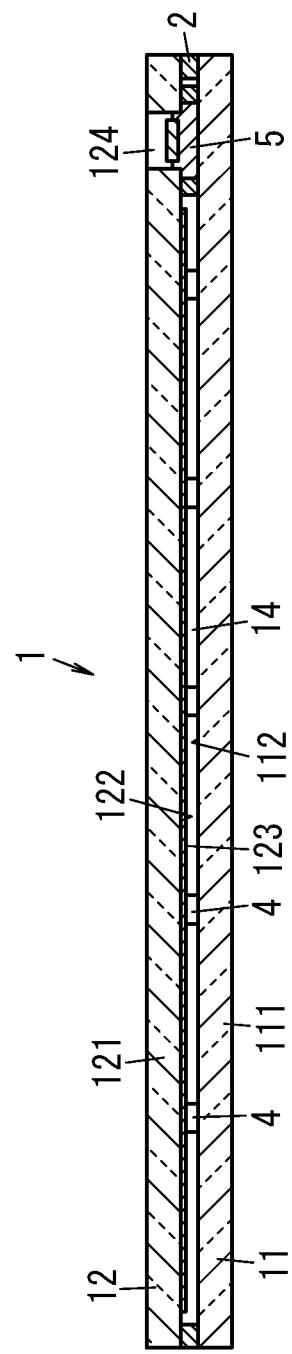
FIG. 4 is a cross-sectional view thereof taken along the plane A-A shown in FIG. 2.

As shown in FIG. 4, the first substrate 11 includes a glass pane 111. The second substrate 12 includes a glass pane 121 and a low-emissivity film (heat reflective film) 123. The low-emissivity film 123 is stacked on the glass pane 121. That is to say, the low-emissivity film 123 is laid on top of the glass pane 121. In the following description, the glass pane 111 will be hereinafter referred to as a "first glass pane 111" and the glass pane 121 will be hereinafter referred to as a "second glass pane 121."

The first glass pane 111 and the second glass pane 121 may be each configured as any of various types of glass panes made of soda lime glass, high strain point glass, chemically tempered glass, alkali-free glass, quartz glass, Neoceram, thermally tempered glass, or any other suitable glass.

One surface 112, out of two surfaces in the thickness direction, of the first substrate 11 faces the second substrate 12. The surface 112 of the first substrate 11 is constituted of the surface of the first glass pane 111.

One surface 122, out of two surfaces in the thickness direction, of the second substrate 12 faces the first substrate 11. That is to say, the surface 112 and the surface 122 face each other. Most of the surface 122 of the second substrate 12 is constituted of the surface of the low-emissivity film 123.

The low-emissivity film 123 contains a metal such as silver with low emissivity, and reduces the transfer of heat due to radiation. Note that the low-emissivity film 123 is thin enough to transmit light, and therefore, hardly affects the transparency of the glass panel unit 1. The low-emissivity film 123 is not stacked on peripheral edges of a surface, facing the first glass pane 111, of the second glass pane 121.

As shown in FIGS. 1 and 2, the sealing portion 2 arranged between the first substrate 11 and the second substrate 12 is formed in a frame shape. The sealing portion 2 may be made of a glass adhesive including a glass frit, for example. The glass frit may be, for example, a low-melting grit frit. Examples of the low-melting glass frits include a bismuth-based glass frit, a lead-based glass frit, and a vanadium-based glass frit. However, the sealing portion 2 does not have to be a glass frit but may also be a low-melting metal or a hot-melt adhesive, for example.

The sealing portion 2 according to this embodiment is formed in a rectangular frame shape. As shown in FIG. 4, the sealing portion 2 is hermetically bonded to respective peripheral edges of the first and second substrates 11 and 12. Thus, the respective peripheral edges of the first and second substrates 11 and 12 are hermetically bonded together with the sealing portion 2. In glass panel unit 1, an internal space 14 is created. The internal space 14 is surrounded with the first substrate 11, the second substrate 12, and the sealing portion 2.

The second substrate 12 has an evacuation port 124 that runs through the second substrate 12 along its thickness. The evacuation port 124 will be used to exhaust the air in the internal space 14 in a process step (such as the evacuating and hermetically sealing step to be described later) during the manufacturing process of the glass panel unit 1.

The evacuation port 124 is sealed with the hermetically sealing portion 5, thus hermetically sealing the internal space 14 of the glass panel unit 1. The hermetically sealing portion 5 may be made of a glass adhesive including a glass frit, for example.

The internal space 14 is an evacuated space that has been evacuated to a degree of vacuum of 0.1 Pa or less, for example. This gives the glass panel unit 1 excellent thermal insulation properties.

In the internal space 14, the plurality of pillars 4 are distributed so as to be spaced apart from each other. The pillars 4 may be made of a glass adhesive including a glass frit, a resin, or a metal, for example. The pillars 4 are either transparent or semi-transparent.

The pillars 4 are in contact with the surface 112 of the first substrate 11 and the surface 122 of the second substrate 12.

The plurality of pillars 4 has the capability of keeping a predetermined gap distance between the first and second substrates 11 and 12.

Figure 5:
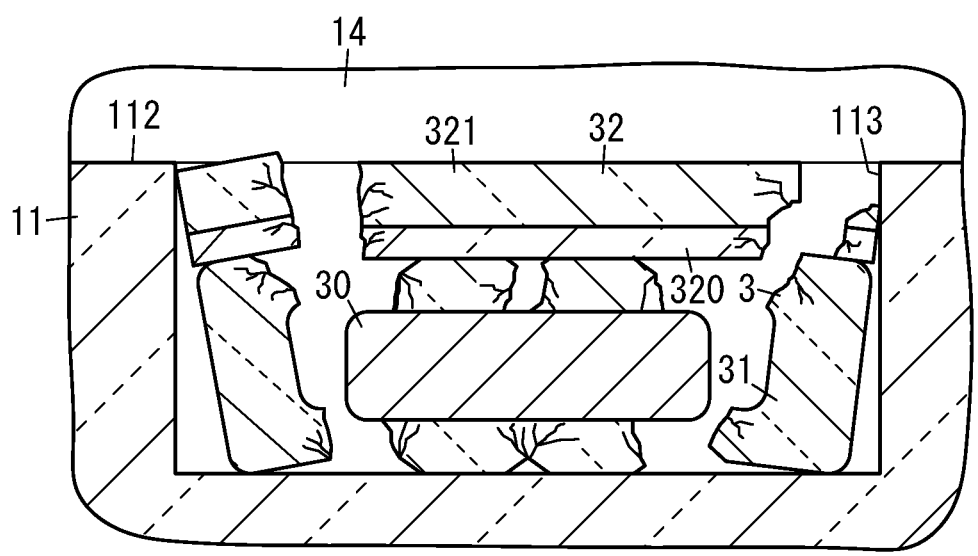
FIG. 5 is a cross-sectional view illustrating a gas adsorption unit of the glass panel unit.

In the internal space 14 of the glass panel unit 1, arranged is the gas adsorption unit 3 shown in FIG. 5. The gas adsorption unit 3 contains a getter 30 that adsorbs a gas, and makes the getter 30 adsorb a gas present in the internal space 14.

Method for Manufacturing Glass Panel Unit

A method for manufacturing the glass panel unit 1 according to this embodiment includes an arrangement step, a bonding step, an evacuating and hermetically sealing step, and a cooling step.

Arrangement Step

Figure 6A:
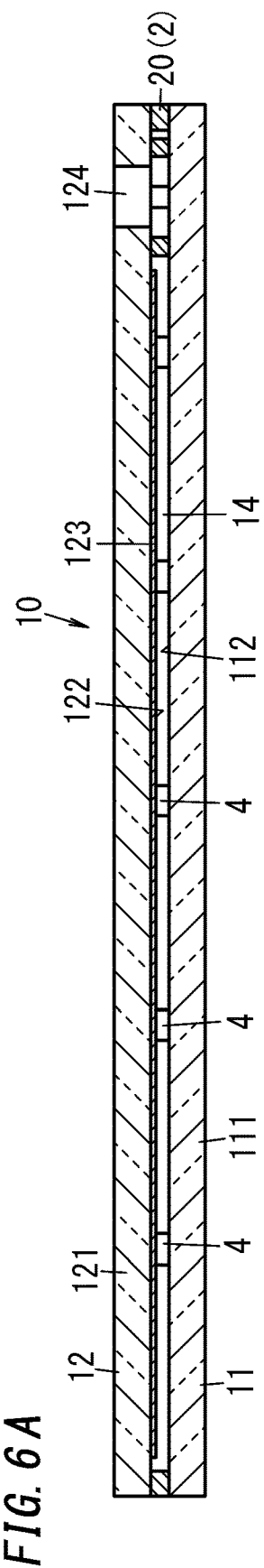
FIGS. 6A and 6B are cross-sectional views sequentially illustrating process steps of a method for manufacturing the glass panel unit.

The arrangement step includes arranging the first substrate 11 and the second substrate 12 such that the first substrate 11 and the second substrate 12 face each other with a frame-shaped sealing material 20 interposed between them, thus creating an internal space 14 surrounded with the first substrate 11, the second substrate 12, and the sealing material 20 as shown in FIG. 6A.

The sealing material 20 will constitute the sealing portion 2 of the glass panel unit 1. An evacuation port 124 is cut through the second substrate 12 along the thickness thereof.

In the arrangement step according to this embodiment, the first substrate 11 is arranged with its surface 112 facing upward. On the surface 112 of the first substrate 11, arranged are the sealing material 20, the plurality of pillars 4, and the gas adsorption unit 3 (see FIG. 7). In addition, the second substrate 12 is mounted over the first substrate 11 with the sealing material 20 and the pillars 4 interposed between them. This allows a glass composite 10 including the first substrate 11, the second substrate 12, the sealing material 20, and the gas adsorption unit 3, to be assembled.

Figure 7:
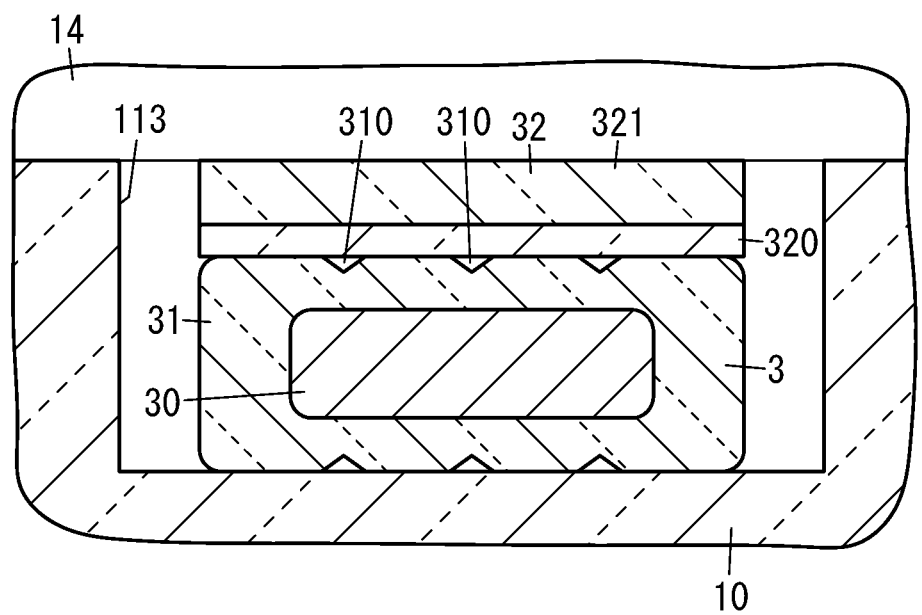
FIG. 7 is a cross-sectional view illustrating a main part of a glass composite obtained during the manufacturing process of the glass panel unit.

In the arrangement step, the sealing material 20 may be applied, using an applicator such as a dispenser, in a frame shape along the outer peripheral edges of the surface 112 of the first substrate 11. In addition, the plurality of pillars 4 are arranged in a regular pattern within a region, surrounded with the sealing material 20, of the surface 112 of the first substrate 11. Furthermore, a gas adsorption unit 3 (see FIG. 7) is arranged in the region, surrounded with the sealing material 20, of the surface 112 of the first substrate 11. The gas adsorption unit 3 of this embodiment is arranged in a recess 113 formed on the surface 112 of the first substrate 11 as shown in FIG. 7. This allows, even if only a narrow gap is left between the first substrate 11 and the second substrate 12, the gas adsorption unit 3 to be arranged in the internal space 14, thus reducing the thickness of the glass panel unit 1.

The gas adsorption unit 3 includes the getter 30, a package 31, and a connector 32. The getter 30 may be either a non-metallic getter (evaporable getter) or a metallic getter (non-evaporable getter) or may also be a getter including both a non-metallic getter and a metallic getter.

The non-metallic getter is a porous getter which adsorbs gas molecules physically by Van del Waals force. The non-metallic getter may be a getter containing a zeolite, active carbon, or magnesium oxide, for example.

The zeolite may be an ion-exchanged zeolite or a non-ion-exchanged zeolite, whichever is appropriate. The ion-exchanged zeolite may contain, as an ion exchange substance, copper ions, potassium ions, ammonium ions, barium ions, strontium ions, sodium ions, calcium ions, iron ions, aluminum ions, magnesium ions, lithium ions, or hydrogen ions, for example.

The metallic getter is a getter with a metallic surface provided to chemically adsorb gas molecules. The metallic getter may be, for example, a zirconium-based alloy getter such as a Zr—Al getter or a Zr—V—Fe getter or a titanium-based alloy getter.

The getter 30 is encapsulated in the package 31 after having been activated through activation processing. When heated to a predetermined temperature (activation temperature) or more, the non-mechanism getter emits (gas) molecules adsorbed. Thus, the non-metallic getter turns into an activated state in which its adsorption capability has been either recovered or enhanced by, for example, being heated to a predetermined temperature or more. Meanwhile, the metallic getter turns into an activated state in which its surface has its adsorption capability enhanced through internal diffusion of a gas adsorbed onto the surface by, for example, being heated to a predetermined temperature (activation temperature) or more.

The getter 30 according to this embodiment is an ion-exchanged zeolite, more specifically, a zeolite subjected to an ion exchange with copper ions. This allows the getter 30 to adsorb nitrogen, oxygen, water, hydrogen, methane, ethane, ammonia, and other substances.

The getter 30 is wrapped in its entirety with the package 31 so as not to be exposed to the external air. This allows the getter 30 that has been activated to be encapsulated by the package 31, thus keeping the getter 30 in the package 31 activated.

The package 31 has a higher melting point than the sealing material 20. The package 31 may be made of a material such as glass or a ceramic.

The package 31 according to this embodiment is made of soda lime glass, which has a thermal expansion coefficient of 8.8 ppm/K.

In the arrangement step, the package 31 is arranged at the bottom of the recess 113 formed on the surface 122 of the first substrate 11 and housed in the recess 113.

In addition, in the arrangement step, a connector 32 having a different thermal expansion coefficient from the package 31 is arranged on an external surface of the package 31. The connector 32 according to this embodiment includes a low-melting member 320 and a connecting member 321.

In the arrangement step, the low-melting member 320 in solid phase is arranged on an outer surface of the package 31. The low-melting member 320 according to this embodiment is arranged on the upper surface of the package 31. The low-melting member 320 has a lower melting point than the package 31 and the sealing material 20. The low-melting member 320 according to this embodiment is made of vanadium-based low-melting glass.

In the arrangement step, the connecting member 321 is arranged on a surface, opposite from the package 31, of the low-melting member 320. This allows the connecting member 321 to be arranged along the outer surface of the package 31 with the low-melting member 320 interposed between them. The connecting member 321 according to this embodiment is arranged on the upper surface of the low-melting member 320 and arranged along the upper surface of the package 31 with the low-melting member 320 interposed between them.

The connecting member 321 has a different thermal expansion coefficient from the package 31. The connecting member 321 according to this embodiment is made of borosilicate glass. The connecting member 321 has a smaller thermal expansion coefficient than the package 31. The thermal expansion coefficient of borosilicate glass is 3.3 ppm/K.

In the arrangement step, the low-melting member 320 is not fixed onto the package 31 or the connecting member 321. Thus, in the arrangement step, the package 31 is arranged so as not to have its thermal deformation interfered with by the connecting member 321 and so as not to easily cause thermal stress to the package 31.

Bonding Step

After the arrangement step, a bonding step is performed. The bonding step is the process step of melting the sealing material 20 by heating the glass composite 10 shown in FIG. 6A and thereby hermetically bonding the first substrate 11 and the second substrate 12 together with the sealing material 20 thus melted.

Figure 8:
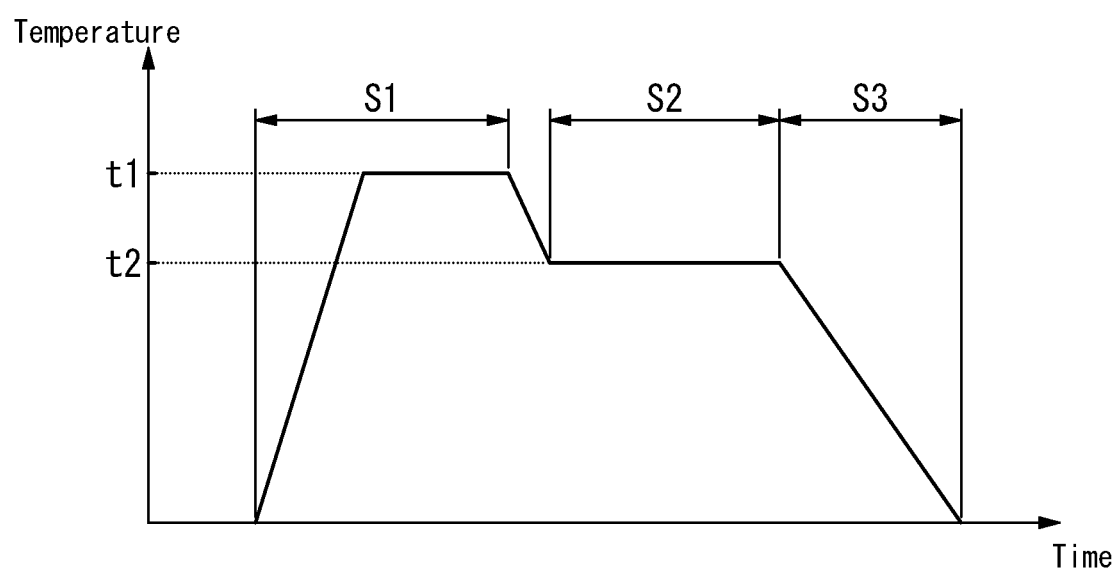
FIG. 8 is a graph showing how the heating temperature of the glass composite changes during the manufacturing process of the glass panel unit.

In the bonding step according to this embodiment, the entire glass composite 10 assembled in the arrangement step is heated in an oven such as a circulating hot air oven. FIG. 8 is a graph showing how the heating temperature (in-oven temperature) of the glass composite 10 changes. In FIG. 8, the range S1 indicates a period for the bonding step.

In the bonding step, the heating temperature of the glass composite 10 is a temperature t1, which is higher than the melting point of the sealing material 20. Thus, in the bonding step, the sealing material 20 surrounding the internal space 14 of the glass composite 10 shown in FIG. 6A is melted and thereby bonded onto the first substrate 11 and the second substrate 12.

The internal space 14 has its periphery hermetically sealed with this sealing material 20 and comes to communicate with the external environment outside of the glass composite 10 only through the evacuation port 124. In the bonding step, the glass composite 10 is heated continuously until the end point of the evacuating and hermetically sealing step to be described later. Note that in the evacuating and hermetically sealing step according to this embodiment, the heating temperature of the glass composite 10 is lowered from the temperature t1 to a temperature t2 (see FIG. 8).

The low-melting member 320 (see FIG. 7) has a lower melting point than the sealing material 20. Thus, when the glass composite 10 is heated as described above at the temperature t1 in the bonding step, the low-melting member 320 melts and is bonded onto the package 31 and connecting member 321 that are adjacent to the low-melting member 320. This allows the connecting member 321 to be connected to the package 31 via the low-melting member 320. That is to say, the bonding step according to this embodiment also serves as a melting step of melting and bonding the low-melting member 320 onto the package 31. That is to say, the melting step is the process step of heating, and thereby melting, the low-melting member 320 at a temperature lower than the melting point of the package 31 to bond the connector 32, including the low-melting member 320, onto the package 31.

The temperature t1 shown in FIG. 8 is lower than the melting point of the package 31. Thus, through the bonding step, the getter 30 remains hermetically encapsulated in the package 31. In addition, the temperature t1 is also lower than the melting point of the connecting member 321, and therefore, the connecting member 321 does not melt, either.

Evacuating and Hermetically Sealing Step

The evacuating and hermetically sealing step is performed after the bonding step. The evacuating and hermetically sealing step is the process step of evacuating and hermetically sealing the internal space 14 of the glass composite 10 (see FIG. 6B).

The evacuating and hermetically sealing step includes an evacuating step and a hermetically sealing step. The evacuating step is the process step of evacuating the internal space 14 of the glass composite 10. The hermetically sealing step is the process step of (hermetically) sealing the internal space 14 that has been evacuated in the evacuating step.

Evacuating Step

Figure 6B:
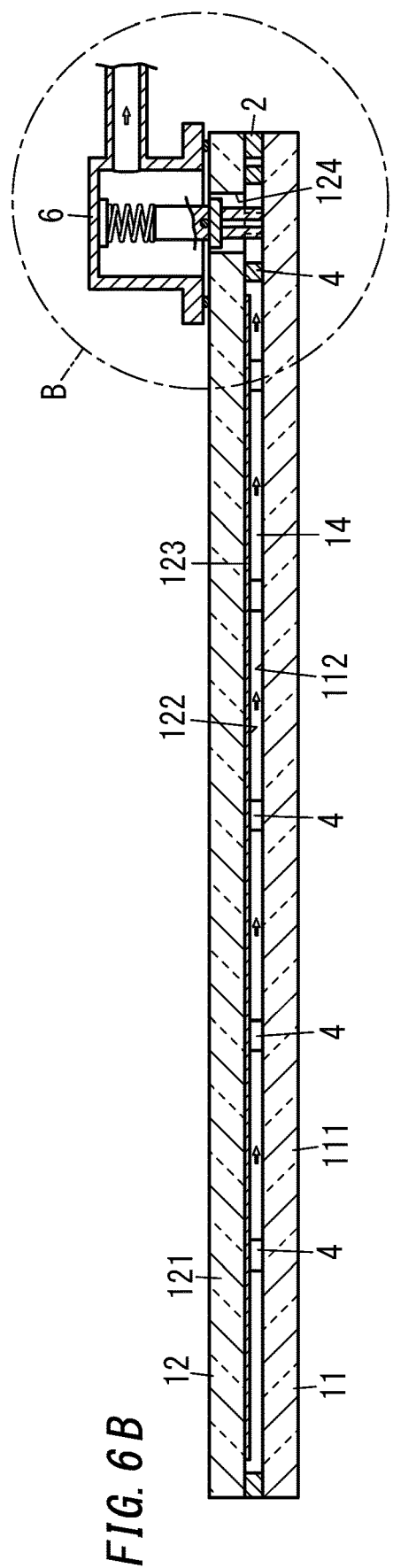

In the evacuating step, the air in the internal space 14 is exhausted through the evacuation port 124 into the external environment outside of the glass composite 10 as shown in FIG. 6B. Thus, the internal space 14 is evacuated. Such exhaustion of the air (i.e., evacuation) from the internal space 14 may be carried out by a vacuum pump connected to the evacuation port 124 via an evacuation head 6, for example.

The range S2 shown in FIG. 8 is a period for the evacuating step. In the evacuating step, the internal space 14 is evacuated while the glass composite 10 is being heated at a temperature t2 lower than the temperature t1. That is to say, in this case, the glass composite 10 is heated to the temperature t2. The temperature t2 is a temperature equal to or lower than the softening point of the sealing material 20. Thus, in the evacuating step, the sealing material 20 is hardly deformed. In other words, this significantly reduces the chances of the sealing material 20 being deformed due to the evacuation of the internal space 14. In addition, the temperature t2 is higher than the melting point of the low-melting member 320. Consequently, through the evacuating step, the low-melting member 320 remains melted.

Hermetically Sealing Step

After the pressure in the internal space 14 has been reduced to a predetermined value or less in the evacuating step, the hermetically sealing step is performed. The hermetically sealing step includes sealing the evacuation port 124 shown in FIG. 9 while evacuating the internal space 14 in the evacuating step, thus turning the internal space 14 into a hermetically sealed, evacuated space.

In the hermetically sealing step according to this embodiment, the evacuation port 124 is sealed with a hermetically sealing material 50. The hermetically sealing material 50 will eventually constitute the hermetically sealing portion 5 of the glass panel unit 1 shown in FIG. 1.

Figure 9:
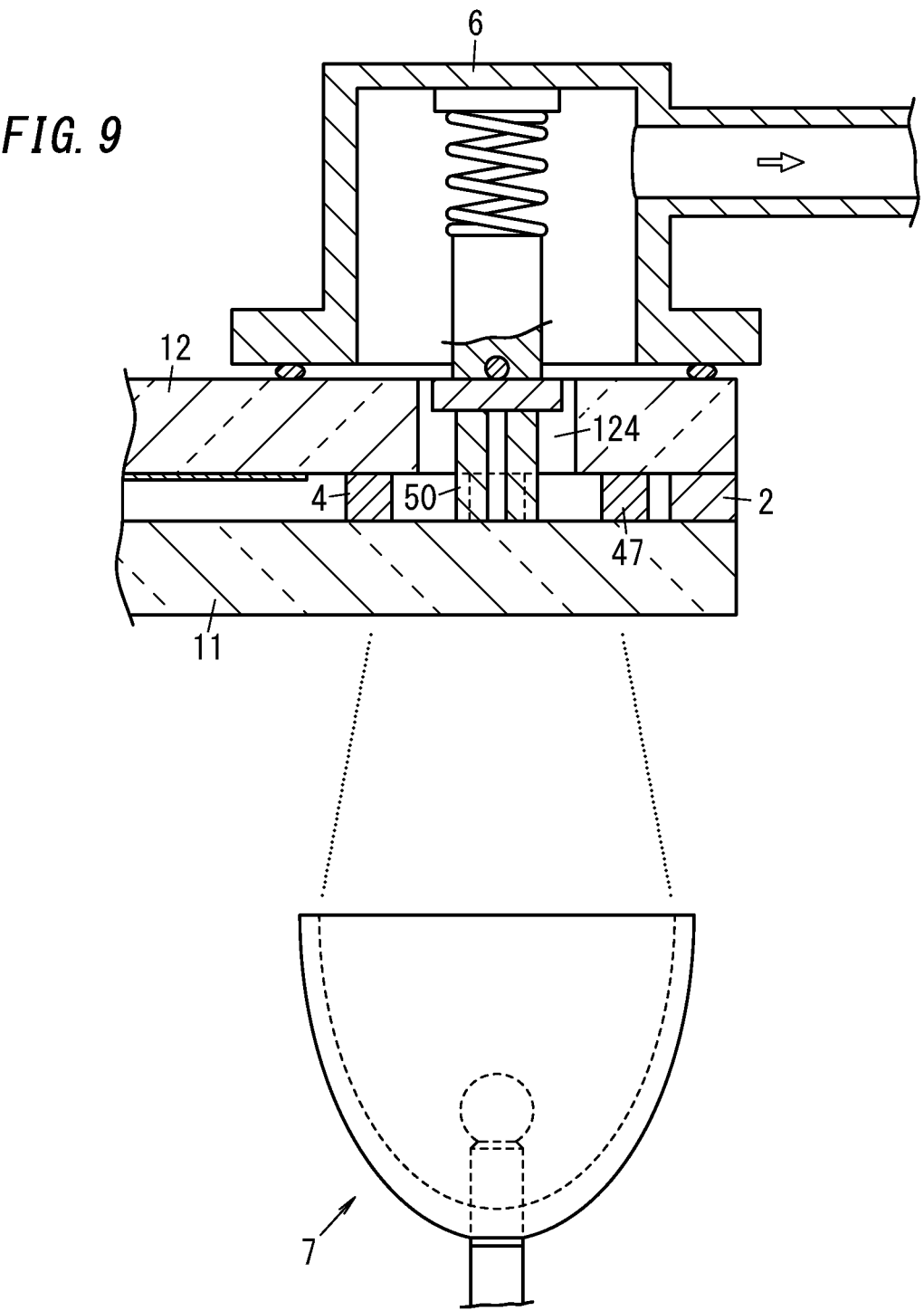
FIG. 9 is an enlarged view of Portion B shown in FIG. 6B.

The hermetically sealing material 50 is arranged in the evacuation port 124 as shown in FIG. 9. This hermetically sealing material 50 softens when the glass composite 10 is heated only locally in the hermetically sealing step, thus sealing the evacuation port 124 with the hermetically sealing material 50. This local heating is conducted by heating the glass composite 10 with an irradiator 7 that radiates either an infrared ray, a laser beam, or any other active ray. In this hermetically sealing step, the local heating is suitably carried out by selectively heating only the hermetically sealing material 50 of the glass composite 10. However, this is only an example and should not be construed as limiting. Alternatively, the local heating may also be carried out by heating the hermetically sealing material 50 as well as its surround region.

Cooling Step

After the evacuating and hermetically sealing step, the cooling step is performed. The range S3 shown in FIG. 8 indicates a period for the cooling step. In the cooling step, heating the glass composite 10 with a circulating hot air oven, which has been conducted continuously since the bonding step, is stopped, thus cooling the entire glass composite 10. Cooling the glass composite 10 in this manner causes the sealing material 20 to cure and turn into the sealing portion 2, and also causes the hermetically sealing material 50 to cure and turn into the hermetically sealing portion 5, thus completing the glass panel unit 1 shown in FIG. 1.

In the cooling step, cooling the glass composite 10 as described above causes the low-melting member 320 (see FIG. 7) that has melted in the melting step (bonding step) to be cooled and cured. This allows the package 31 shown in FIG. 7 to be connected to the connecting member 321 via the low-melting member 320. That is to say, the cooling step according to this embodiment also serves as a curing step of cooling, and thereby curing, the low-melting member 320 to connect the package 31 to the connector 32 including the low-melting member 320.

Curing the low-melting member 320 to have the connecting member 321 connected to the package 31 via the low-melting member 320 as described above allows the connector 32 (connecting member 321) to restrict the thermal deformation of the package 31, thus making it easy to cause thermal stress.

In this cooling step, the glass composite 10 is cooled continuously even after the low-melting member 320 has been cured as described above. Thus, each of the package 31 and connector 32 of the gas adsorption unit 3 is cooled and shrinks. At this time, the deformation of the package 31 is restricted by the connector 32 (connecting member 321). Thus, thermal stress, resulting from a difference in thermal expansion coefficient between the package 31 and the connector 32 (connecting member 321) connected to the package 31, is caused to the package 31. Consequently, this thermal stress breaks the package 31 open as shown in FIG. 5, thus opening the seal of the getter 30 by the package 31. That is to say, the cooling step according to this embodiment also serves as a seal opening step of breaking the package 31 open by causing thermal stress to the package 31.

Breaking the package 31 open through the seal opening step (cooling step) described above makes the getter 30 that has been encapsulated in the activate state in the package 31 exposed to the space outside of the package 31. Thus, the gas in the internal space 14 of the glass composite 10 is adsorbed into the getter 30.

In this embodiment, in the gas adsorption unit 3 to be arranged in the arrangement step, the outer surfaces of the package 31 have a plurality of notches 310 as shown in FIG. 7. Thus, when the thermal stress is caused to the package 31, the package 31 tends to break open easily.

In the gas adsorption unit 3 according to this embodiment, the getter 30 remains hermetically encapsulated in the package 31 through the seal opening step (cooling step) to be performed after the evacuating and hermetically sealing step, thus making the adsorption capability of the getter 30 hardly deteriorative. This allows the gas emitted in the internal space 14 of the glass composite 10 after the evacuating and hermetically sealing step to be efficiently adsorbed into the getter 30, thus providing a glass panel unit 1 with an excellent degree of vacuum.

The glass panel unit 1 according to this embodiment that has been manufactured through these process steps has the evacuated internal space 14, and therefore, exhibits excellent thermal insulation properties.

Variations

Next, variations of the exemplary embodiment will be described. In the following description of first to fourth variations, any constituent element of these variations, having the same function as a counterpart of the exemplary embodiment described above, will be designated by the same reference numeral as that counterpart's, and a detailed description thereof will be omitted herein to avoid redundancies.

First Variation

First of all, a first variation will be described. In the gas adsorption unit 3 for use in the method for manufacturing the glass panel unit 1 according to this variation, the first substrate 11 is used as the connecting member 321 and the connecting member 321 of the exemplary embodiment described above is not used as shown in FIG. 10. That is to say, the connecting member 321 according to this variation is the first substrate 11 (first glass pane 111). The first substrate 11 has a larger thermal expansion coefficient than the package 31. The connector 32 according to this variation is made up of the first substrate 11 (serving as the connecting member 321) and the low-melting member 320.

Figure 10:
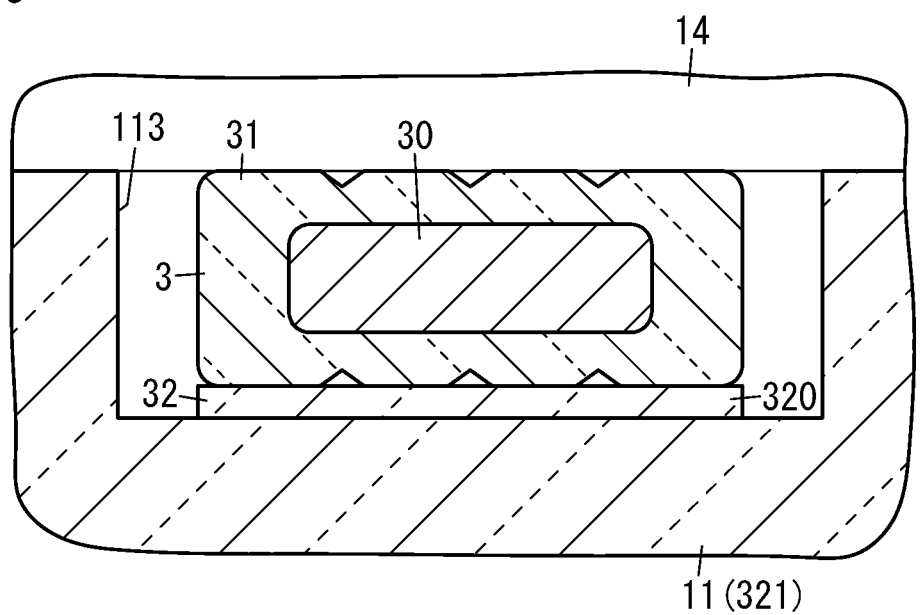
FIG. 10 is a cross-sectional view illustrating a main part of a glass composite obtained during a manufacturing process of a glass panel unit according to a first variation.

In the arrangement step, the low-melting member 320 is arranged at the bottom of the recess 113 of the first substrate 11 and the package 31 is arranged on the upper surface of the low-melting member 320 as shown in FIG. 10.

In this variation, when the low-melting member 320 is heated and melted in the melting step (bonding step), the low-melting member 320 is bonded onto the package 31 and the first substrate 11 (serving as the connecting member 321) that are adjacent to the low-melting member 320. Thereafter, when the low-melting member 320 is cooled and cured in the curing step (cooling step), the package 31 is connected to the first substrate 11 via the low-melting member 320 and the thermal deformation of the package 31 is restricted by the first substrate 11. Subsequently, when each of the package 31 and the first substrate 11 is cooled to shrink in the seal opening step (cooling step), the package 31 breaks open due to a difference in thermal expansion coefficient between the package 31 and the first substrate 11.

According to this variation, the first substrate 11 also serves as the connecting member 321, thus reducing the number of members for use to manufacture the glass panel unit 1. In addition, in the arrangement step, there is no need to arrange another member as the connecting member 321 separately from the first substrate 11, thus facilitating the manufacturing of the glass panel unit 1.

Second Variation

Figure 11:
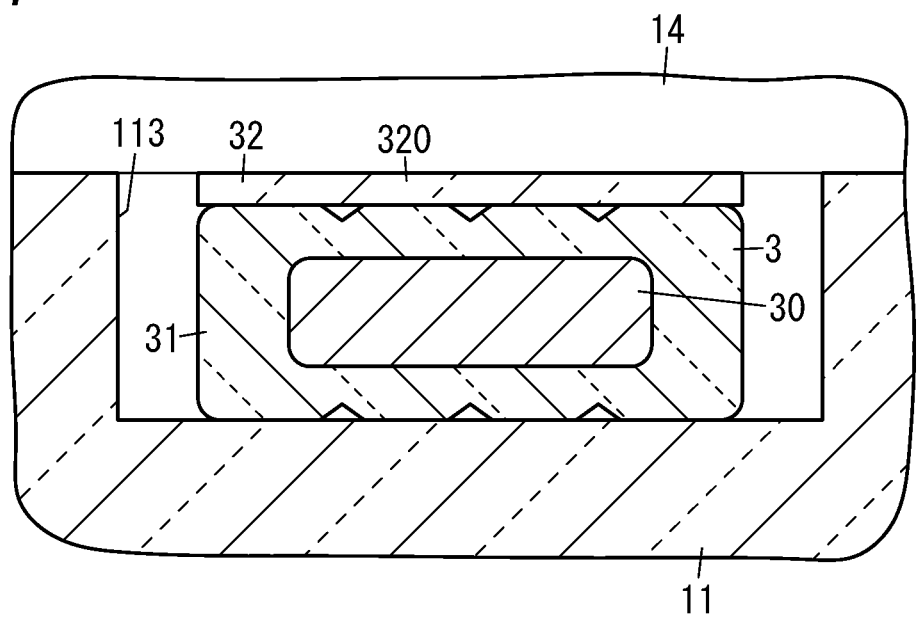
FIG. 11 is a cross-sectional view illustrating a main part of a glass composite obtained during a manufacturing process of a glass panel unit according to a second variation.

Next, a second variation will be described. The gas adsorption unit 3 for use in the method for manufacturing the glass panel unit 1 according to this variation does not include the connecting member 321 of the exemplary embodiment as shown in FIG. 11. The connector 32 according to this variation consists of the low-melting member 320. The low-melting member 320 has a smaller thermal expansion coefficient than the package 31.

In this variation, when the low-melting member 320 is heated and melted in the melting step (bonding step), the low-melting member 320 (connector 32) is bonded onto the package 31 adjacent to the low-melting member 320. Thereafter, when the low-melting member 320 is cooled and cured in the curing step (cooling step), the package 31 is connected to the low-melting member 320 and the thermal deformation of the package 31 is restricted by the low-melting member 320 thus cured. Subsequently, when each of the package 31 and the low-melting member 320 is cooled to shrink in the seal opening step (cooling step), the package 31 breaks open due to a difference in thermal expansion coefficient between the package 31 and the low-melting member 320.

According to this variation, the package 31 may be broken open even without using the connecting member 321, thus reducing the number of members for use to manufacture the glass panel unit 1. In addition, in the arrangement step, there is no need to arrange the connecting member 321, thus facilitating the manufacturing of the glass panel unit 1.

Third Variation

Next, a third variation will be described with reference to FIGS. 6A, 6B, and 7. In this variation, the low-melting member 320 has a higher melting point than the sealing material 20. The low-melting member 320 according to this variation is not melted when the glass composite 10 is heated to melt the sealing material 20 in the bonding step.

In this variation, the melting step of melting and bonding the low-melting member 320 to the package 31 and the connecting member 321 is performed by heating the low-melting member 320 through local heating of only a part of the glass composite 10 after the evacuating and hermetically sealing step (i.e., either during or after the cooling step). This local heating may be conducted by irradiating the target with an infrared ray, a laser beam, or any other active ray, for example. Note that this local heating may be conducted either by heating the low-melting member 320 directly or by heating at least one of the package 31 or the connecting member 321 so that the heat is transferred to the low-melting member 320. That is to say, the local heating may be conducted by heating the low-melting member 320 alone or by heating only a region surrounding the low-melting member 320 out of the glass composite 10, whichever is appropriate. Alternatively, the local heating may also be conducted by heating only the low-melting member 320 and a region, surrounding the low-melting member 320, of the glass composite 10.

The local heating described above may be stopped in a predetermined amount of time, for example, thus performing the curing step of cooling, and thereby curing, the low-melting member 320 and the seal opening step of breaking the package 31 open by further cooling the gas adsorption unit 3, of which the low-melting member 320 has been cured.

According to this variation, performing the melting step described above allows a member having a higher melting point than the sealing material 20 to be used as the low-melting member 320.

Fourth Variation

Next, a fourth variation will be described with reference to FIG. 7. In this variation, the seal opening step of breaking the package 31 open by causing thermal stress to the package 31 is performed after the evacuating and hermetically sealing step (i.e., either during or after the cooling step). This seal opening step is performed by heating either the package 31 or the connecting member 321, or both, through local heating of only a part of the glass composite 10. This local heating may be conducted by, for example, irradiating the target with an infrared ray, a laser beam, or any other active ray.

According to this variation, either the package 31 or the connecting member 321, or both, are locally heated in the seal opening step to cause thermal stress to the package 31 and thereby break the package 31 open.

Optionally, the seal opening step according to the third variation described above may be replaced with the seal opening step according to this variation.

Fifth Variation

Next, a fifth variation will be described with reference to FIGS. 6A, 6B, and 7. In the bonding step according to the exemplary embodiment described above, the glass composite 10 needs to be heated to a temperature high enough to melt the sealing material 20. Nevertheless, to save energy, the heating temperature of the glass composite 10 is suitably as low as possible. However, cotton that is a main ingredient of dust has a firing point of 407° C. Thus, if the glass composite 10 is heated to a temperature of 407° C. or less, then some dust could be left inside of the glass composite 10. Allowing dust to be left inside of the glass composite 10 could cause the dust to emit a hydrocarbon-based gas, thus possibly causing a decrease in the degree of vacuum.

Thus, to avoid such a decrease in the degree of vacuum, the glass composite 10 is heated in the bonding step according to this variation to a temperature of 407° C. or less to melt the sealing material 20 (i.e., the glass composite 10 is heated in the bonding step to a temperature of 407° C. or less), and a non-metallic getter is used as the getter 30.

As can be seen, melting the sealing material 20 in the bonding step by heating the glass composite 10 to a temperature of 407° C. or less contributes to energy saving. In addition, even if any dust remains in the glass composite 10 after the bonding step, the hydrocarbon-based gas emitted from such dust may be adsorbed into the getter 30 configured as a non-metallic getter. Furthermore, if either the pillars 4 or the sealing material 20 contains any resin material such as an imide group, imidazole, or oxazole, then a hydrocarbon-based gas or an ammonium gas could also be emitted from the resin material. Nevertheless, according to this variation, the gas emitted from any of these resin materials is also able to be adsorbed into the getter 30 configured as a non-metallic getter, thus allowing a glass panel unit 1 with an excellent degree of vacuum to be manufactured.

Sixth Variation

Figure 12:
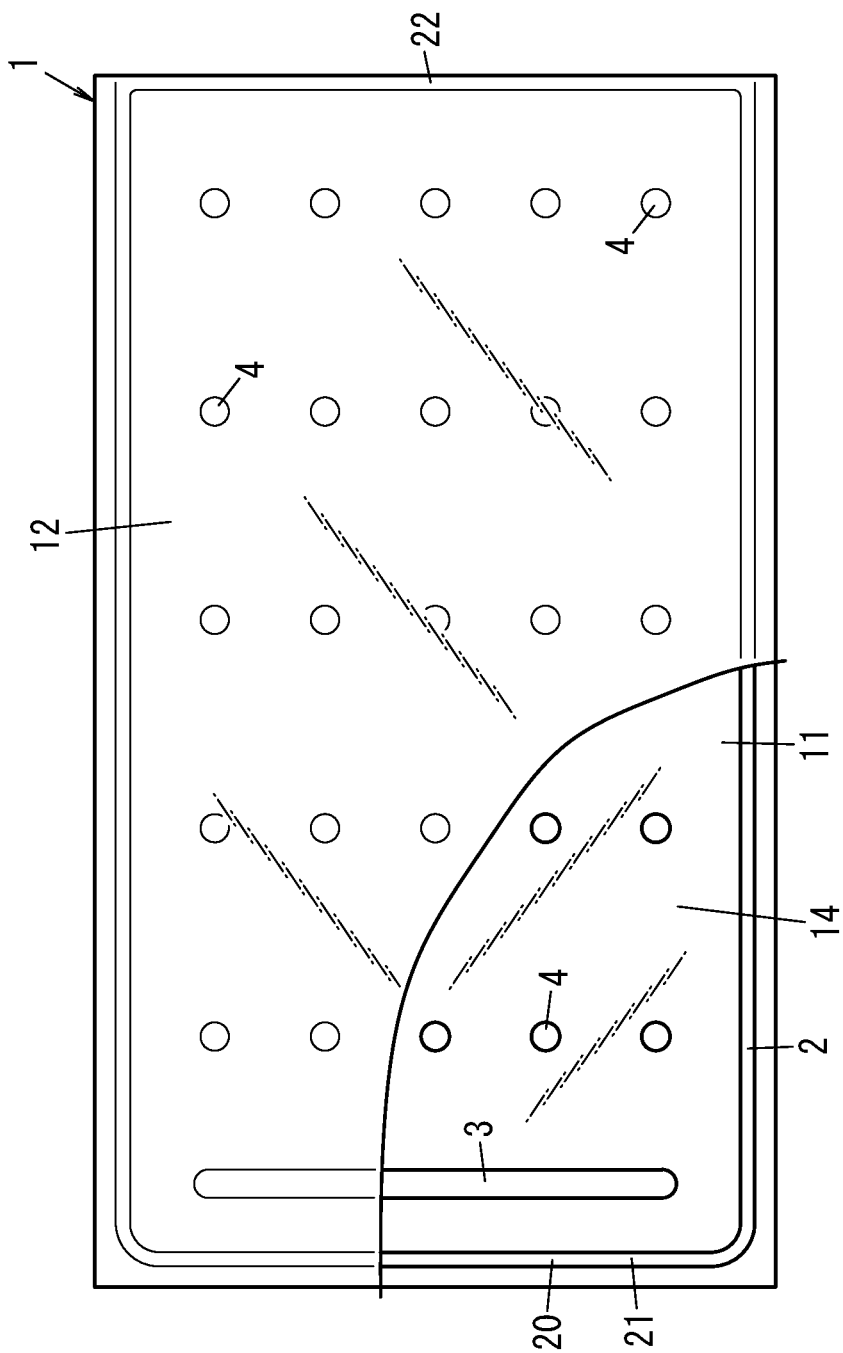
FIG. 12 is a partially cutaway plan view of a glass panel unit according to a sixth variation.

Next, a sixth variation will be described. The sealing portion 2 of the glass panel unit 1 according to the sixth variation shown in FIG. 12 includes a first part 21 and a second part 22. The first part 21 is formed along three out of the four sides of the first substrate 11 and the second part 22 is formed along the other side of the first substrate 11.

In the arrangement step of the method for manufacturing the glass panel unit 1 according to this variation, the sealing material 20, the plurality of pillars 4, and the gas adsorption unit 3 are arranged on the surface 112 of the first substrate 11 (see FIG. 13) as in the arrangement step according to the exemplary embodiment described above. Note that the sealing material 20 to be arranged in this process step includes a frame 23 and a partition 24.

Figure 13:
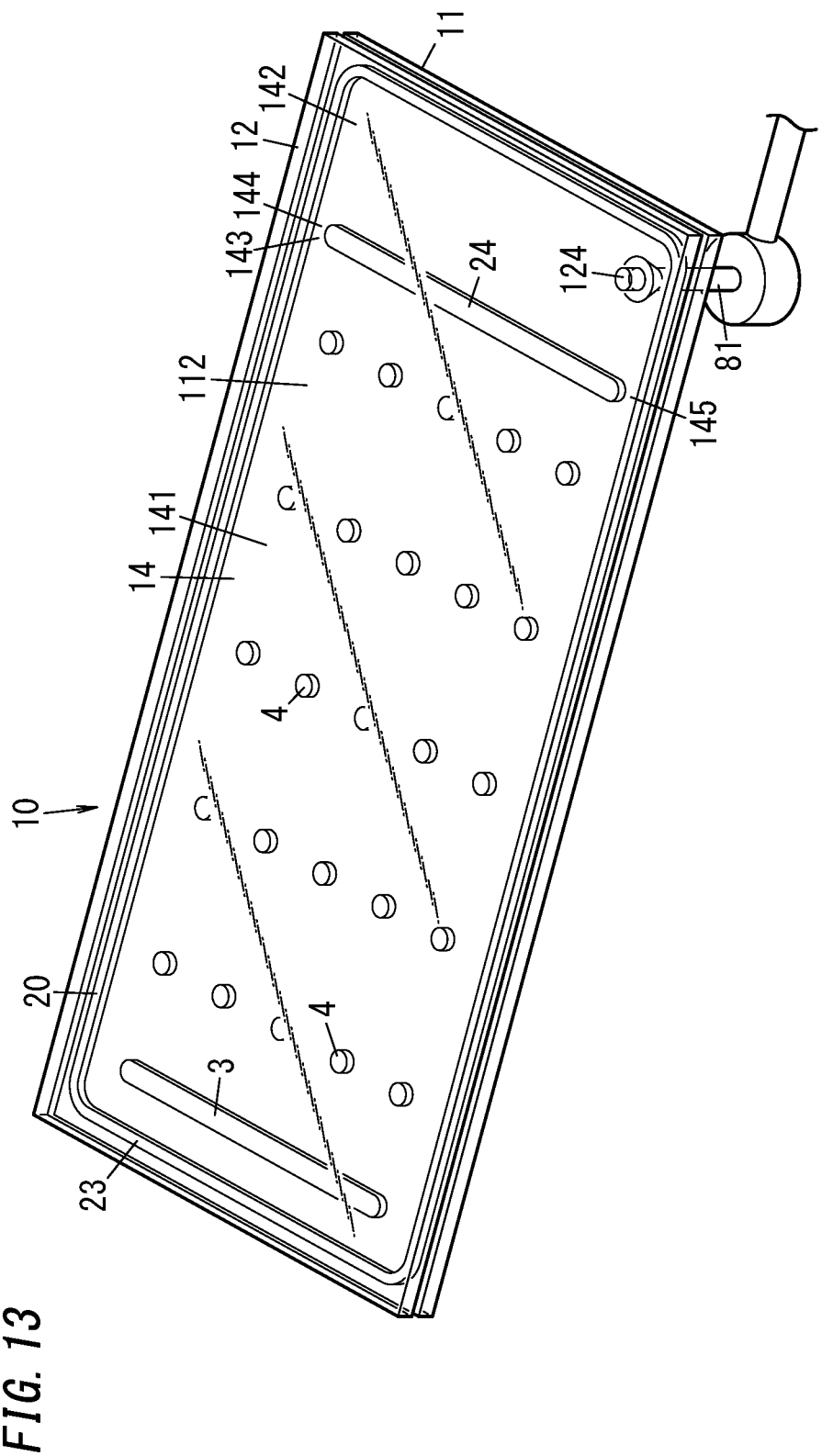
FIG. 13 is a perspective view of a glass composite obtained during the manufacturing process of the glass panel unit.

The frame 23 shown in FIG. 13 includes a first sealing adhesive (first thermal adhesive) with a first softening point. The frame 23 is formed in the shape of a rectangular frame along outer peripheral edges of the first substrate 11. The partition 24 includes a second sealing adhesive (second thermal adhesive) with a second softening point. The second softening point of the second sealing adhesive is higher than the first softening point of the first sealing adhesive. The partition 24 is formed in the shape of a straight line extending along the width of the first substrate 11 so as to be located inside of the frame 23. Each of the first sealing adhesive and the second sealing adhesive may be made of the same glass adhesive as that of the sealing portion 2 of the exemplary embodiment described above.

In the arrangement step according to this variation, after the sealing material 20, the plurality of pillars 4, and the gas adsorption unit 3 have been arranged on the surface 112 of the first substrate 11 as described above, the second substrate 12 is mounted over the first substrate 11 with the sealing material 20 and the plurality of pillars 4 interposed between them, thus forming the glass composite 10 shown in FIG. 13.

In the glass composite 10, the internal space 14 is created to be surrounded with the frame 23, the first substrate 11, and the second substrate 12. The partition 24 is arranged in the internal space 14. The partition 24 partitions the internal space 14 into a first space 141 and a second space 142. Note that both longitudinal ends of the partition 24 are out of contact with the frame 23. Also, the evacuation port 124 is cut through the first substrate 11 and communicates with the second space 142. The gas adsorption unit 3 and the plurality of pillars 4 are arranged in the first space 141. That is to say, in the arrangement step, the gas adsorption unit 3 and the plurality of pillars 4 are arranged in a region, corresponding to the first space 141, of the surface 112 of the first substrate 11.

The internal space 14 of the glass composite 10 has air passages 143. The air passages 143 connect the first space 141 and the second space 142 together. The air passages 143 include a first air passage 144 and a second air passage 145. Each of the first and second air passages 144 and 145 is a gap left between the partition 24 and the frame 23.

The bonding step according to this variation to be performed after the arrangement step includes heating the glass composite 10 and thereby melting the frame 23 to hermetically bond the first substrate 11 and the second substrate 12 together with the frame 23 thus melted. In this case, however, it is only the frame 23, not the partition 24, that melts out of the sealing material 20.

Figure 14:
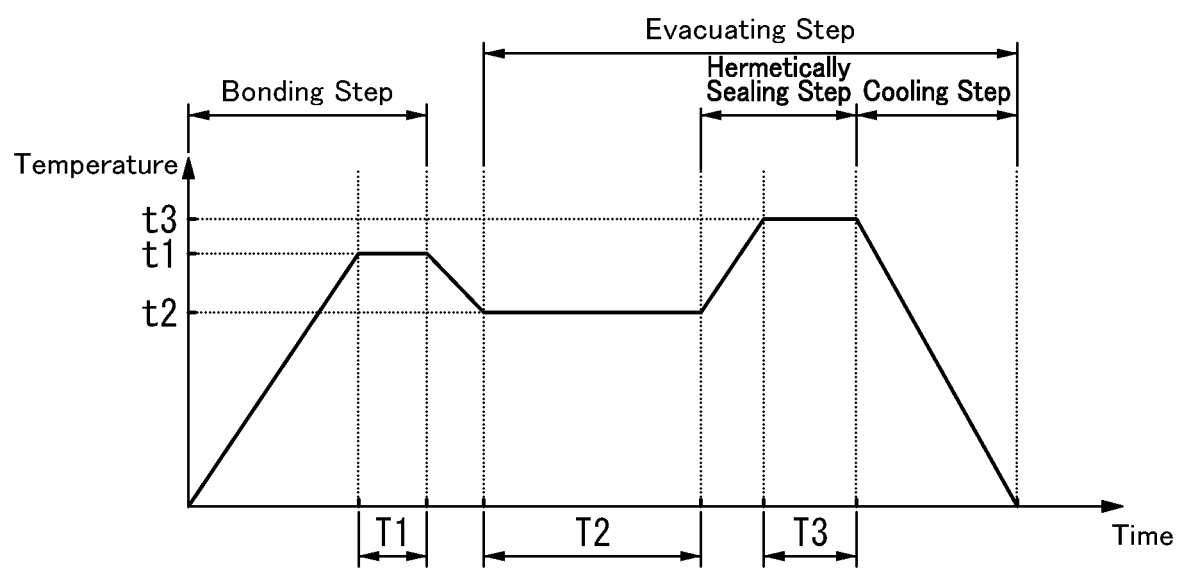
FIG. 14 is a graph showing how the heating temperature changes in the glass composite.

FIG. 14 is a graph showing how the heating temperature of the glass composite 10 (i.e., the in-oven temperature) changes. Specifically, in the bonding step, the glass composite 10 is arranged in the oven and heated at a first heating temperature t1 for a first predetermined amount of time T1.

The first heating temperature t1 is a temperature equal to or higher than the first softening point of the first sealing adhesive and lower than the second softening point of the second sealing adhesive. The first heating temperature t1 may be 270° C., for example. The first predetermined amount of time T1 may be 15 minutes, for example.

The evacuating step according to this variation to be conducted after the bonding step includes evacuating the first space 141 through the air passages 143, the second space 142, and the evacuation port 124 of the glass composite 10 shown in FIG. 13. In this process step, the evacuation is performed using a vacuum pump through an evacuation pipe 81 connected to the evacuation port 124.

In the evacuating step, the internal space 14 is evacuated with the glass composite 10 heated at a second heating temperature t2 lower than the first heating temperature t1 (see FIG. 14). That is to say, in this case, the glass composite 10 is heated to the second heating temperature t2. The second heating temperature t2 is a temperature lower than the first softening point of the first sealing adhesive and the second softening point of the second sealing adhesive, and may be 250° C., for example. Thus, in the evacuating step, the internal space 14 is evacuated while neither the frame 23 nor the partition 24 is softened yet. In the evacuating step, the glass composite 10 keeps being heated at the second heating temperature t2 for a second predetermined amount of time T2. The second predetermined amount of time T2 may be 60 minutes, for example.

The hermetically sealing step according to this variation is performed after the glass composite 10 has been heated at the second heating temperature t2 for the second predetermined amount of time T2 in the evacuating step. In this case, the hermetically sealing step is performed after the pressure in the internal space 14 has become equal to or less than a predetermined value.

Figure 15:
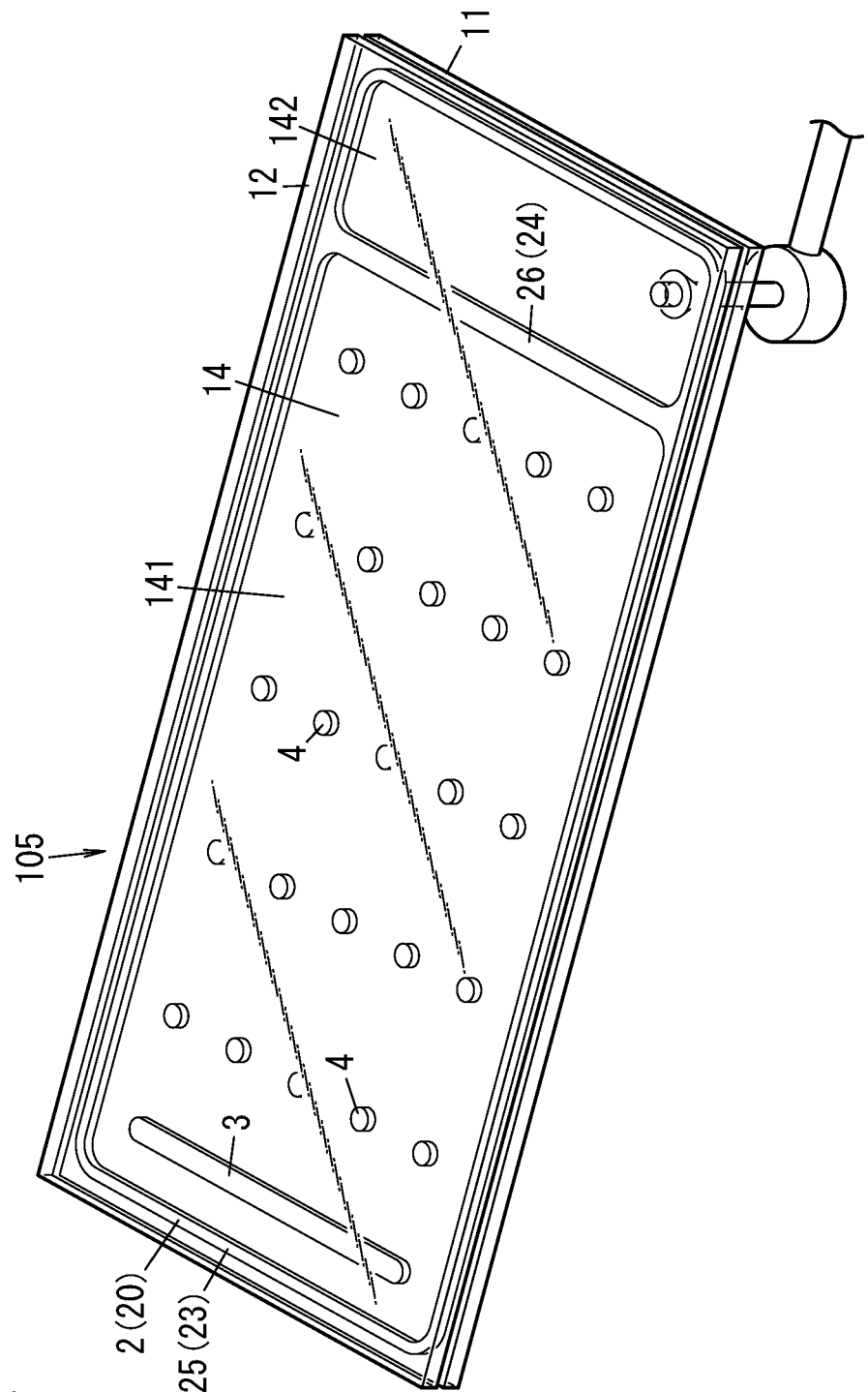
FIG. 15 is a perspective view of a work in progress obtained by the method for manufacturing the glass panel unit.

The hermetically sealing step according to this variation includes heating, and thereby melting, the partition 24 shown in FIG. 13 while evacuating the internal space 14 in the evacuating step, thus closing the air passages 143 with the partition 24 thus melted (see FIG. 15). That is to say, the hermetically sealing step includes melting, and thereby deforming, the partition 24 such that both ends of the partition 24 are connected to the frame 23. Deforming the partition 24 in this manner allows the partition 24 to hermetically partition the internal space 14 into the first space 141 and the second space 142 shown in FIG. 15. Consequently, the first space 141 is hermetically sealed by the first substrate 11, the second substrate 12, the frame 23, and the partition 24. As used herein, "to hermetically seal the internal space" may refer to hermetically sealing the internal space 14 only partially (i.e., only the first space 141) as is done in this variation.

Specifically, in the hermetically sealing step, the glass composite 10 shown in FIG. 13 is heated at a third heating temperature t3 for a third predetermined amount of time T3 (see FIG. 14). The third heating temperature t3 is higher than the first heating temperature t1 and the second heating temperature t2 and equal to or higher than the second softening point of the second sealing adhesive. The third heating temperature t3 may be set at 300° C., for example. The third predetermined amount of time T3 may be 30 minutes, for example. In this variation, evacuation of the first space 141 performed with a vacuum pump in the evacuating step is continued even after the hermetically sealing step has been started. However, this is only an example and should not be construed as limiting. Alternatively, the evacuation of the first space 141 may be ended at a point in time when the hermetically sealing step is started.

In the cooling step according to this variation to be performed after the hermetically sealing step, heating of the glass composite 10 with the oven, which has been performed continuously since the bonding step, is stopped, thereby cooling the entire glass composite 10.

According to this variation, the work in progress 105 shown in FIG. 15 is obtained through the arrangement step, bonding step, evacuating and hermetically sealing step, and cooling step described above. The work in progress 105 includes the first substrate 11, the second substrate 12, the sealing portion 2, the plurality of pillars 4, and the gas adsorption unit 3. The sealing portion 2 of the work in progress 105 includes a frame portion 25 that is a cured product of the frame 23 and a partition portion 26 that is a cured product of the partition 24.

Figure 16:
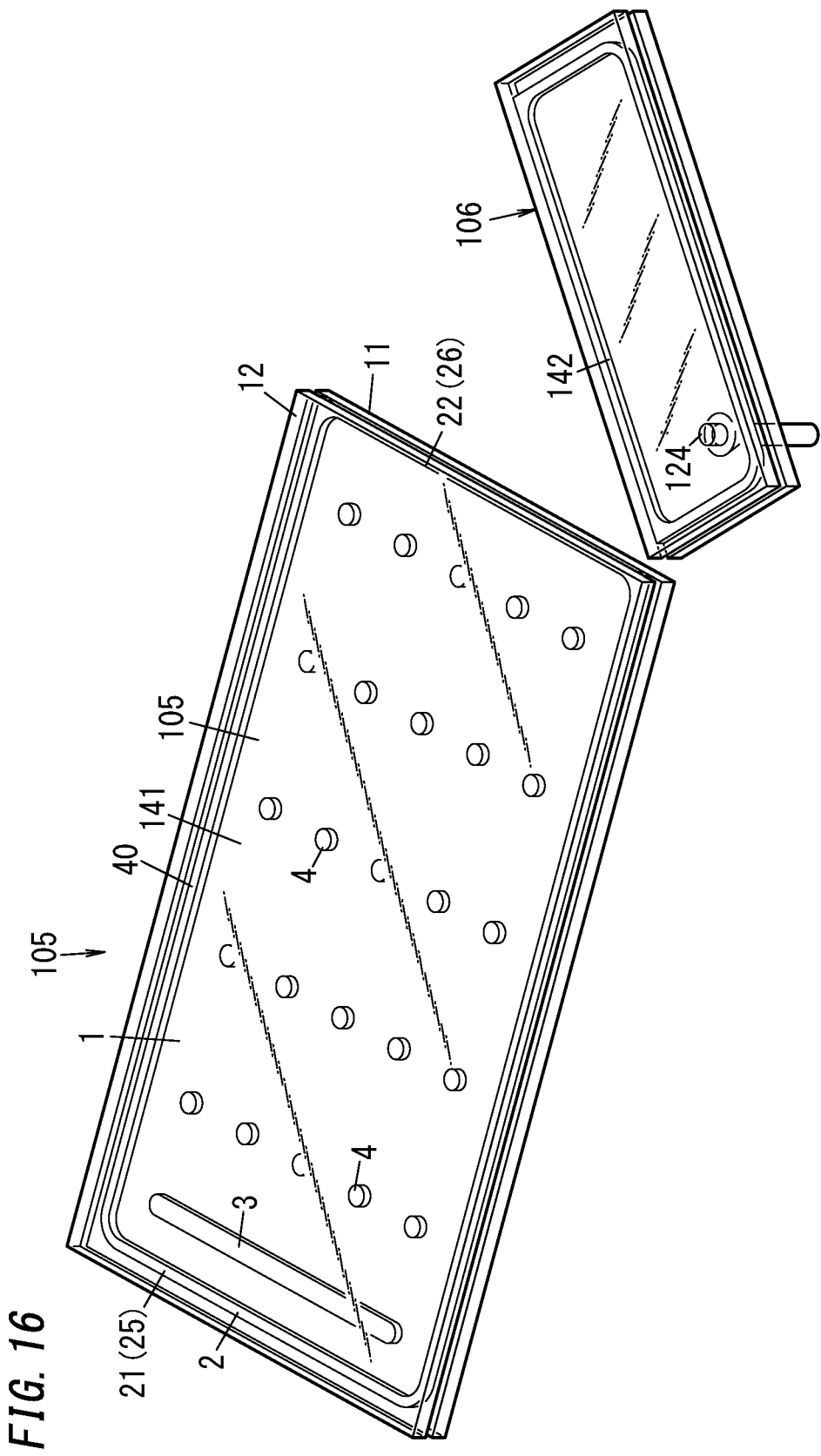
FIG. 16 is a perspective view illustrating how to cut the work in progress.

The method for manufacturing the glass panel unit 1 according to this variation further includes a removing step to be performed after the cooling step. The removing step is the process step of removing a portion 106 including the second space 142 and the evacuation port 124 from the work in progress 105 to obtain the glass panel unit 1 with the first space 141 as shown in FIG. 16. That is to say, the glass panel unit 1 is the rest of the work in progress 105 other than the portion 106 that has been removed in the removing step.

Specifically, the removing step includes removing the portion 106 by cutting off the work in progress 105 along the partition portion 26. Alternatively, the work in progress 105 may also be cut along a line passing through the second space 142.

The sealing portion 2 of the glass panel unit 1, obtained in this manner by going through the arrangement step, bonding step, evacuating and hermetically sealing step, cooling step, and removing step described above, includes the first part 21 constituted of a part of the frame portion 25 and the second part 22 constituted of a part of the partition portion 26.

Next, the gas adsorption unit 3 according to this variation will be described with reference to FIGS. 6A, 6B, and 7. In the gas adsorption unit 3 according to this variation, the melting point of the low-melting member 320 is higher than the first softening point and the second softening point. Thus, the low-melting member 320 is not melted even when the glass composite 10 is heated to melt the sealing material 20 in the bonding step.

In this variation, the melting step of melting, and thereby bonding, the low-melting member 320 to the package 31 and the connecting member 321 is performed by heating the low-melting member 320 through local intensive heating of only a part of the glass composite 10 after the evacuating and hermetically sealing step (i.e., either during or after the cooling step). This local heating is conducted by irradiating the target with an infrared ray, a laser beam, or any other active ray. Note that this local heating may be conducted either by heating the low-melting member 320 directly or by heating at least one of the package 31 or the connecting member 321 so that the heat is transferred to the low-melting member 320. That is to say, the local heating may be conducted either by heating the low-melting member 320 alone or by heating only a region surrounding the low-melting member 320, out of the glass composite 10. Alternatively, the local heating may also be conducted by heating only the low-melting member 320 and a region, surrounding the low-melting member 320, of the glass composite 10.

The local heating described above may be stopped in a predetermined amount of time, for example, thus performing the curing step of cooling, and thereby curing, the low-melting member 320 and the seal opening step of breaking the package 31 open by further cooling the gas adsorption unit 3, of which the low-melting member 320 has been cured.

According to this variation, performing the melting step described above allows a member having a higher melting point than the sealing material 20 to be used as the low-melting member 320.

Optionally, according to this variation, the melting step of melting the low-melting member 320 may be performed by heating the glass composite 10 to be conducted in the hermetically sealing step, for example. In that case, a member with a melting point higher than the first softening point and lower than the second softening point may be used as the low-melting member 320.

Seventh Variation

Figure 17:
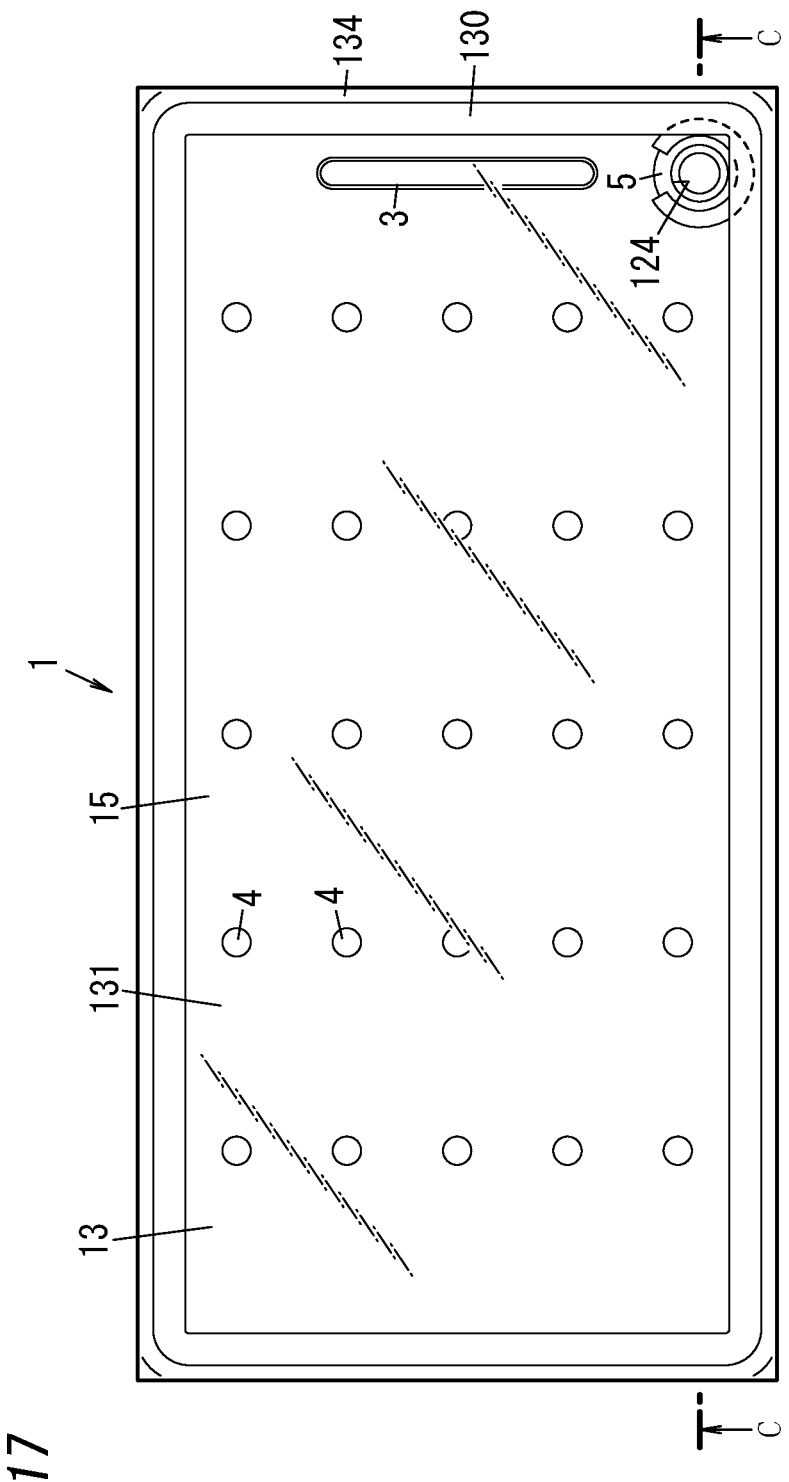
FIG. 17 is a plan view illustrating a glass panel unit according to a seventh variation.
Figure 18:
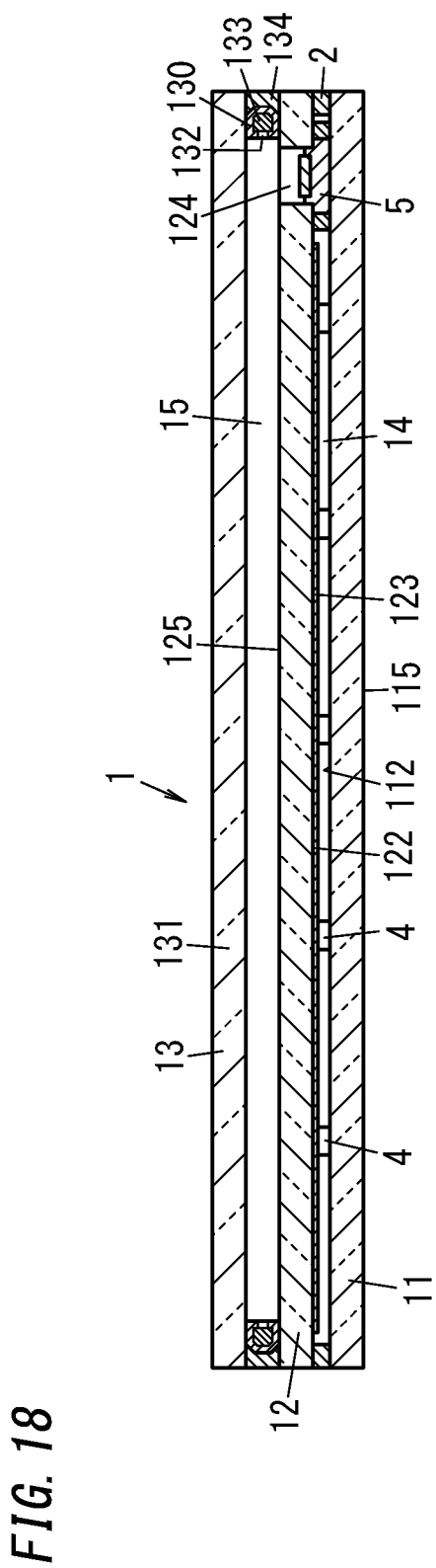
FIG. 18 is a cross-sectional view thereof taken along the plane C-C shown in FIG. 17.

Next, a seventh variation will be described. FIGS. 17 and 18 illustrate a glass panel unit 1 according to this variation. The glass panel unit 1 according to this variation includes not only the first substrate 11 and the second substrate 12 but also a third substrate 13 as well.

In the glass panel unit 1 according to this variation, the third substrate 13 faces the other surface 125, facing away from the first substrate 11, of the second substrate 12, thus creating a second internal space 15 between the second substrate 12 and the third substrate 13.

The third substrate 13 includes a glass pane 131. The glass pane 131 will be hereinafter referred to as a "third glass pane 131."

The glass panel unit 1 according to this variation further includes a pillar 130, a second sealing material 134, and a desiccant 133. Between the respective peripheral edges of the second and third substrates 12 and 13, interposed are the pillar 130 and the second sealing material 134. The pillar 130 is formed in a frame shape and has a hollow portion. The second sealing material 134 is also formed in a frame shape. The second sealing material 134 covers the outer periphery of the pillar 130. The hollow portion of the pillar 130 is filled with the desiccant 133. The second internal space 15 is a space entirely surrounded with the second sealing material 134. The pillar 130 is located in the second internal space 15.

The pillar 130 is made of a metal such as aluminum and has vent holes 132 cut through inner peripheral edges thereof. The vent holes 132 allow the hollow portion of the pillar 130 to communicate with the second internal space 15.

The desiccant 133 may be a silica gel, for example. The second sealing material 134 is suitably made of a highly airtight resin such as silicone resin or butyl rubber.

The second internal space 15 surrounded with the second substrate 12, the third substrate 13, and the second sealing material 134 is a hermetically sealed space that does not communicate with the external environment. The second internal space 15 is filled with a dry gas (e.g., a dry rare gas such as argon gas or dry air).

The method for manufacturing the glass panel unit 1 according to this variation includes not only the arrangement step, bonding step, evacuating and hermetically sealing step, and cooling step described above, but also a second bonding step as well. The second bonding step is the process step of hermetically bonding the second and third substrates 12 and 13 (or the first and third substrates 11 and 13) together via the second sealing material 134 with the pillar 130 interposed between them.

Building Component

Figure 19:
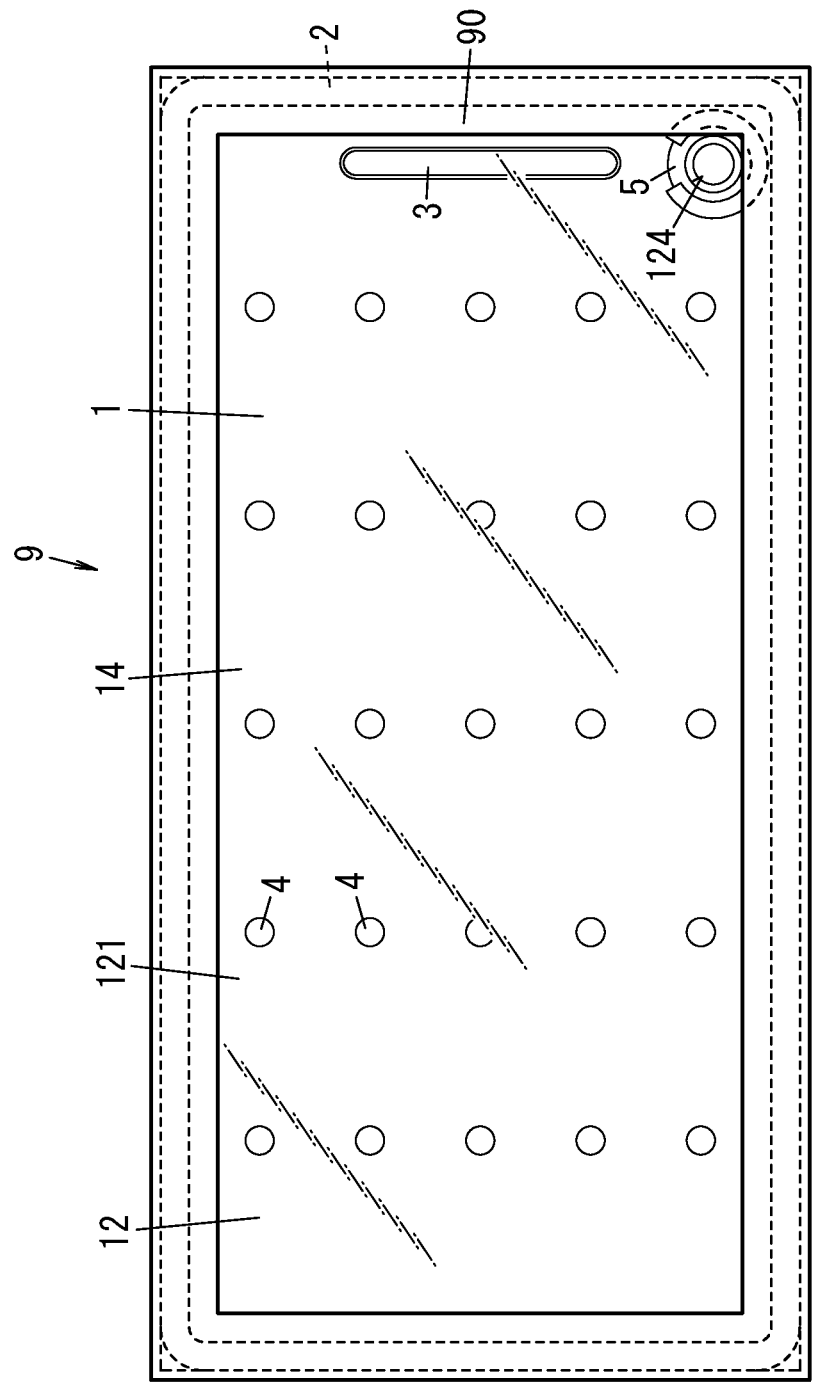
FIG. 19 is a plan view of a building component including the glass panel unit.

Next, a building component 9 including the glass panel unit 1 according to the exemplary embodiment will be described. The building component 9 shown in FIG. 19 includes the glass panel unit 1 according to the exemplary embodiment described above and a building component frame 90. The building component frame 90 is fitted onto the glass panel unit 1.

In this embodiment, the building component frame 90 may be a window frame and the building component 9 is a glass window. The building component 9 (glass window) may be used as a show window, for example. The method for manufacturing the building component 9 includes not only the respective process steps of the method for manufacturing the glass panel unit 1 according to the exemplary embodiment but also a fitting step to be described below.

The fitting step is the process step of fitting the building component frame 90 in a rectangular shape onto the peripheral edges of the glass panel unit 1 that has been manufactured through the arrangement step, bonding step, evacuating and hermetically sealing step, and cooling step described above. The building component 9 manufactured through these process steps includes the glass panel unit 1 with the evacuated internal space 14, and therefore, exhibits excellent thermal insulation properties.

Supplements

The glass panel units 1 according to the exemplary embodiment and first through seventh variations and the building component 9 may be readily modified, or appropriately combined with each other, in various manners depending on a design choice or any other factor.

For example, the low-emissivity film 123 does not have to be included in the second substrate 12 but may be included in the first substrate 11 instead. In that case, the low-emissivity film 123 is stacked on one surface (more specifically, one surface facing the first substrate 11) of the second glass pane 121 along the thickness thereof so as to face the internal space 14. Also, the pressure in the internal space 14 may just needs to be lower than the atmospheric pressure and may be higher than 0.1 Pa, for example.

Optionally, the pillars 4 may be opaque ones. The material, dimensions, shape, arrangement pattern, and other parameters of the pillars 4 may be changed as appropriate. Likewise, the material, dimensions, shape, arrangement pattern, and other parameters of the sealing portion 2 may also be changed as appropriate. Furthermore, the material, dimensions, shape and other parameters of the hermetically sealing portion 5 may also be changed as appropriate. Optionally, the evacuation port 124 may be cut through the first substrate 11. Also, the evacuation port 124 may be sealed up by partially melting either the first glass pane 111 or the second glass pane 121.

If necessary, the glass panel unit 1 may include a plurality of gas adsorption units 3. In that case, the glass panel unit 1 may include a gas adsorption unit 3 with a non-metallic getter as the getter 30 and another gas adsorption unit 3 with a metallic getter as the getter 30.

Furthermore, the package 31 may be made of any type of glass other than soda lime glass and may also be made of a ceramic. Optionally, the package 31 may contain glass or a ceramic partially. In that case, the package 31 may include a sheet of metal foil, for example, as a base member to which the glass or ceramic is fixed. Also, the notches 310 of the package 31 may be omitted.

Furthermore, the low-melting member 320 according to the exemplary embodiment and the first, second, fourth, fifth, and seventh variations described above may have a higher melting point than the sealing material 20. In that case, to prevent the heating temperature of the glass composite 10 from becoming too high while melting the low-melting member 320 in the bonding step, the difference in melting point between the low-melting member 320 and the sealing material 20 is suitably within 30° C. Also, the low-melting member 320 according to the second variation may have a larger thermal expansion coefficient than the package 31. Furthermore, the material for the connecting member 321 does not have to be borosilicate glass but may also be any other type of glass or a ceramic.

Optionally, the connecting member 321 according to the first variation may also be the second substrate 12. In the third, fourth, and sixth variations, the connecting member 321 may also be omitted as in the second variation.

The methods for manufacturing a glass panel unit 1 according to the exemplary embodiment and first through seventh variations thereof and the method for manufacturing the building component 9 may be readily modified, or appropriately combined with each other, in various manners depending on a design choice or any other factor.

For example, in the arrangement step, the gas adsorption unit 3 may be arranged in a recess 113 formed on the surface 122 of the second substrate 12. Also, in the arrangement step, the surface 112 or 122 on which the gas adsorption unit 3 is arranged may be an entirely flat surface as well.

Optionally, the evacuating step according to the exemplary embodiment described above may be started when the sealing material 20 is heated at the temperature t1 in the bonding step.

Furthermore, in the exemplary embodiment and first through seventh variations described above, the seal opening step is performed after the evacuating and hermetically sealing step. However, this is only an example and should not be construed as limiting. Alternatively, the seal opening step may also be performed during the evacuating and hermetically sealing step. That is to say, the seal opening step needs to be performed either during, or after, the evacuating and hermetically sealing step.

Furthermore, the heating temperature of the glass composite 10 in the evacuating step may be as high as the heating temperature t1 of the glass composite 10 in the bonding step.

Optionally, a single or a plurality of glass panel units 1 may be formed by dividing a glass panel unit 1 manufactured by the same method as the manufacturing method of the exemplary embodiment. In that case, for example, a glass panel unit 1, of which the internal space 14 is partitioned by another sealing portion, is formed, and then the glass panel unit 1 is cut off along the other sealing portion, thus forming a single or plurality of glass panel units 1.

Also, the non-metallic getter for use as the getter 30 according to the fifth variation may be any of the exemplary alternative zeolites enumerated in the foregoing description of the exemplary embodiment or an active carbon or magnesium oxide mentioned in the foregoing description of the exemplary embodiment.

If necessary, the third glass pane 131 according to the seventh variation may include an appropriate coating. Also, the third substrate 13 of the glass panel unit 1 according to the seventh variation may face the other surface 115 (see FIG. 18), facing away from the second substrate 12, of the first substrate 11 so that the second internal space 15 is created between the first substrate 11 and the third substrate 13.

Optionally, a single or a plurality of glass panel units 1 may be formed by dividing a glass panel unit 1 manufactured by the same method as the manufacturing method of the seventh variation. In that case, for example, a glass panel unit 1, of which the internal space 14 is partitioned by another (second) sealing portion, and of which the second internal space 15 is partitioned by still another (third) sealing portion, is formed, and then the glass panel unit 1 is cut off along the second and third sealing portions, thus forming a single or plurality of glass panel units 1. Alternatively, the third substrate 13 may be stacked on the glass panel unit 1 according to any of the first through sixth variations or any of the divisions thereof.

Furthermore, the building component 9 does not have to be a glass window but may also be a main entrance door, an interior door, or any other type of building component as well.

Furthermore, in the method for manufacturing the building component 9 according to the exemplary embodiment described above, the building component frame 90 is fitted onto the glass panel unit 1 formed by going through the arrangement step, bonding step, evacuating and hermetically sealing step, and cooling step. However, this is only an example and should not be construed as limiting. Alternatively, the building component frame 90 may also be fitted into any of the divisions of the glass panel unit 1 formed by going through these process steps. Likewise, the building component frame 90 may be fitted onto the glass panel unit 1 according to any of the first through seventh variations described above or any of the divisions thereof.

Advantages

As can be seen from the foregoing description of the exemplary embodiment and first to seventh variations thereof, a method for manufacturing a glass panel unit (1) according to a first aspect has the following features. Specifically, the method for manufacturing a glass panel unit (1) according to the first aspect includes an arrangement step, a bonding step, and an evacuating and hermetically sealing step. The arrangement step includes arranging a first substrate (11), including a glass pane (111), and a second substrate (12), including another glass pane (121), such that the first substrate (11) and the second substrate (12) face each other with a frame-shaped sealing material (20) interposed between the first and second substrates (11, 12). The arrangement step further includes creating an internal space (14) surrounded with the first substrate (11), the second substrate (12), and the sealing material (20). The bonding step includes heating a glass composite (10), including the first substrate (11), the second substrate (12), and the sealing material (20), to melt the sealing material (20) and thereby hermetically bond the first substrate (11) and the second substrate (12) together with the sealing material (20) thus melted. The evacuating and hermetically sealing step includes evacuating and hermetically sealing the internal space (14). The arrangement step further includes arranging a gas adsorption unit (3) inside of the frame-shaped sealing material (20). The gas adsorption unit (3) includes a getter (30) that has been activated, a package (31) encapsulating the getter (30) therein, and a low-melting member (320) having a lower melting point than the package (31). The method for manufacturing a glass panel unit (1) further includes a melting step, a curing step, and a seal opening step. The melting step includes heating, and thereby melting, the low-melting member (320) at a temperature lower than a melting point of the package (31) to bond a connector (32) including the low-melting member (320) onto the package (31). That is to say, in this process step, the low-melting member (320) is heated to a temperature lower than the melting point of the package (31). The curing step includes cooling and thereby curing, after the bonding step, the low-melting member (320) that has melted in the melting step. The seal opening step includes causing, either during, or after, the evacuating and hermetically sealing step, thermal stress resulting from a difference in thermal expansion coefficient between the package (31) and the connector (32) to the package (31) connected to the connector (32) and breaking the package (31) with the thermal stress to open a seal of the getter (30) by the package (31).

The method for manufacturing a glass panel unit (1) according to the first aspect allows a glass panel unit (1) with excellent thermal insulation properties, of which the internal space (14) is sealed hermetically, to be manufactured by performing the arrangement step, the bonding step, and the evacuating and hermetically sealing step. In addition, this method also allows the gas emitted in the internal space (14) to be adsorbed into the getter (30) either during, or after, the evacuating and hermetically sealing step by opening the seal of the getter (30) by the package (31) through the melting step, the curing step, and the seal opening step. In this case, the getter (30) that has been activated will be kept encapsulated in the package (31) until the seal opening step to be performed either during, or after, the evacuating and hermetically sealing step. This allows the gas emitted in the internal space (14) to be efficiently adsorbed into the getter (30). Besides, in this case, there is no need to perform the process step of activating the getter (30). Thus, either during, or after, the evacuating and hermetically sealing step, there is no need to heat the glass composite (10) to a temperature equal to or higher than the activation temperature of the getter (30), thus reducing the consumption of the energy. In addition, this also allows a getter (30) with a high activation temperature to be used as the getter (30).

It is also possible to open the seal of the getter (30) by the package (31) by, for example, heating the package (31) to a high temperature and thereby causing thermal cracks or any other breaks in the package (31). In that case, however, the consumption of the energy tends to increase significantly. In contrast, in the method for manufacturing a glass panel unit (1) according to the first aspect, in the bonding step of bonding the low-melting member (320) to the package (31), the low-melting member (320) needs to be heated to a temperature lower than the melting point of the package (31), thus cutting down the consumption of the energy significantly.

As can also be seen from the foregoing description of the exemplary embodiment and first and third to seventh variations thereof, a method for manufacturing a glass panel unit (1) according to a second aspect may be implemented in combination with the first aspect. Specifically, in the method for manufacturing a glass panel unit (1) according to the second aspect, the connector (32) includes a connecting member (321) having a different thermal expansion coefficient from the package (31). The melting step includes bonding the low-melting member (320) to the package (31) and the connecting member (321). The curing step includes cooling, and thereby curing, the low-melting member (320).

The method for manufacturing a glass panel unit (1) according to the second aspect uses, as the connecting member (321), a member with a different thermal expansion coefficient from the package (31), thus causing thermal stress to the package (31) and thereby breaking the package (31) open.

As can also be seen from the foregoing description of the exemplary embodiment and third to seventh variations thereof, a method for manufacturing a glass panel unit (1) according to a third aspect may be implemented in combination with the second aspect. In the method for manufacturing a glass panel unit (1) according to the third aspect, the gas adsorption unit (3) includes the connecting member (321).

The method for manufacturing a glass panel unit (1) according to the third aspect uses, as the connecting member (321) included in the gas adsorption unit (3), a member with a different thermal expansion coefficient from the package (31), thus causing thermal stress to the package (31) and thereby breaking the package (31) open.

As can also be seen from the foregoing description of the first variation, a method for manufacturing a glass panel unit (1) according to a fourth aspect may be implemented in combination with the second aspect. According to the fourth aspect, the connecting member (321) is either the first substrate (11) or the second substrate (12).

The method for manufacturing a glass panel unit (1) according to the fourth aspect allows either the first substrate (11) or the second substrate (12) to be used as the connecting member (321), thus reducing the number of members for use to manufacture the glass panel unit (1).

As can also be seen from the foregoing description of the second variation, a method for manufacturing a glass panel unit (1) according to a fifth aspect may be implemented in combination with the first aspect. According to the fifth aspect, the connector (32) consists essentially of the low-melting member (320).

The method for manufacturing a glass panel unit (1) according to the fifth aspect allows the low-melting member (320) to be used as the connector (32), thus reducing the number of members for use to manufacture the glass panel unit (1).

As can also be seen from the foregoing description of the exemplary embodiment and the first, second, fifth, and sixth variations thereof, a method for manufacturing a glass panel unit (1) according to a sixth aspect may be implemented in combination with any one of the first to fifth aspects. According to the sixth aspect, the bonding step includes heating the entire glass composite (10) at a temperature lower than the melting point of the package (31) to melt the sealing material (20) and the low-melting member (320). That is to say, in this process step, the entire glass composite (10) is heated to a temperature lower than the melting point of the package (31). The bonding step also serves as the melting step.

In the method for manufacturing a glass panel unit (1) according to the sixth aspect, the bonding step also serves as the melting step, thus facilitating manufacturing of the glass panel unit (1).

As can also be seen from the foregoing description of the third and sixth variations, a method for manufacturing a glass panel unit (1) according to a seventh aspect may be implemented in combination with any one of the first to fifth aspects. In the method for manufacturing a glass panel unit (1) according to the seventh aspect, the melting step includes heating, either during, or after, the evacuating and hermetically sealing step, the glass composite (10) only partially and thereby heating and melting the low-melting member (320).

The method for manufacturing a glass panel unit (1) according to the seventh aspect allows the low-melting member (320) to be melted either during, or after, the evacuating and hermetically sealing step by heating the glass composite (10) only partially.

As can also be seen from the foregoing description of the exemplary embodiment and the first to third and fifth to seventh variations thereof, a method for manufacturing a glass panel unit (1) according to an eighth aspect may be implemented in combination with any one of the first to seventh aspects. According to the eighth aspect, the seal opening step includes causing the thermal stress to the package (31) by cooling at least one of the package (31) or the connector (32).

The method for manufacturing a glass panel unit (1) according to the eighth aspect allows the thermal stress to be caused to the package (31) by cooling at least one of the package (31) or the connector (32).

As can also be seen from the foregoing description of the fourth variation, a method for manufacturing a glass panel unit (1) according to a ninth aspect may be implemented in combination with any one of the first to seventh aspects. According to the ninth aspect, the seal opening step includes causing the thermal stress to the package (31) by heating at least one of the package (31) or the connector (32).

The method for manufacturing a glass panel unit (1) according to the ninth aspect allows the thermal stress to be caused to the package (31) by heating at least one of the package (31) or the connector (32).

As can also be seen from the foregoing description of the exemplary embodiment and the first to seventh variations thereof, a method for manufacturing a glass panel unit (1) according to a tenth aspect may be implemented in combination with any one of the first to ninth aspects. According to the tenth aspect, the package (31) includes either glass or a ceramic.

The method for manufacturing a glass panel unit (1) according to the tenth aspect facilitates breaking the package (31) open in the seal opening step.

As can also be seen from the foregoing description of the exemplary embodiment and the first to seventh variations thereof, a method for manufacturing a glass panel unit (1) according to an eleventh aspect may be implemented in combination with any one of the first to tenth aspects. According to the eleventh aspect, the package (31) has a notch (310).

The method for manufacturing a glass panel unit (1) according to the eleventh aspect facilitates breaking the package (31) open in the seal opening step by providing a notch (310) for the package (31).

As can also be seen from the foregoing description of the fifth variation, a method for manufacturing a glass panel unit (1) according to a twelfth aspect may be implemented in combination with any one of the first to eleventh aspects. According to the twelfth aspect, the getter (30) is a non-metallic getter, and the bonding step includes heating the glass composite (10) at a temperature of 407° C. or less to melt the sealing material (20).

The method for manufacturing a glass panel unit (1) according to the twelfth aspect saves the energy by heating the glass composite (10) at a temperature of 407° C. or less to melt the sealing material (20). In addition, this also allows, even if any dust is left in the internal space (14) of the glass composite (10) after the bonding step, a hydrocarbon based gas emitted from the dust to be adsorbed into the getter (30) configured as a non-metallic getter. Furthermore, this also allows, even if any resin is contained in the sealing material (20), for example, a gas emitted from the resin to be adsorbed into the getter (30) configured as a non-metallic getter. This enables manufacturing of a glass panel unit (1) with a sufficiently high degree of vacuum.

As can also be seen from the foregoing description of the seventh variation, a method for manufacturing a glass panel unit (1) according to a thirteenth aspect may be implemented in combination with any one of the first to eleventh aspects. The method for manufacturing a glass panel unit (1) according to the thirteenth aspect further includes a second bonding step. The second bonding step includes bonding a third substrate (13) to either the first substrate (11) or the second substrate (12) with a second sealing material (134) in a frame shape.

The method for manufacturing a glass panel unit (1) according to the thirteenth aspect allows a glass panel unit (1) with further improved thermal insulation properties to be manufactured by providing the glass panel unit (1) with the third substrate (13).

As can be seen from the foregoing description of the exemplary embodiment, a method for manufacturing a building component (9) according to a fourteenth aspect has the following features. The method for manufacturing a building component (9) according to the fourteenth aspect includes a fitting step. The fitting step includes fitting a building component frame (90) onto a glass panel unit (1) manufactured by the method for manufacturing a glass panel unit (1) according to any one of the first to thirteenth aspects.

The method for manufacturing a building component (9) according to the fourteenth aspect enables manufacturing of a building component (9) including the glass panel unit (1) and a building component frame (90).

As can be seen from the foregoing description of the exemplary embodiment and the first to seventh variations thereof, a gas adsorption unit (3) according to a fifteenth aspect has the following configuration. The gas adsorption unit (3) according to the fifteenth aspect includes a getter (30), a package (31), and a low-melting member (320). The getter (30) has been activated. The package (31) encapsulates the getter (30) therein. The low-melting member (320) is arranged along an outer surface of the package (31) and has a lower melting point than the package (31).

The gas adsorption unit (3) according to the fifteenth aspect allows, when a glass panel unit (1) is manufactured, for example, the low-melting member (320) to be bonded onto the package (31) by heating, and thereby melting, the low-melting member (320) at a temperature lower than the melting point of the package (31). That is to say, in this case, the low-melting member (320) is heated to a temperature lower than the melting point of the package (31). Next, the low-melting member (320) is cooled and cured, thereby connecting the package (31) to the connector (32) including the low-melting member (320). Thereafter, thermal stress resulting from a difference in thermal expansion coefficient between the package (31) and the connector (32) is caused to the package (31) connected to the connector (32), thereby breaking the package (31) open with the thermal stress and opening the seal of the getter (30) by the package (31). Thus, the gas adsorption unit (3) may be used effectively in the method for manufacturing a glass panel unit (1) according to any one of the first to thirteenth aspects and in the method for manufacturing a building component (9) according to the fourteenth aspect.

As can also be seen from the foregoing description of the exemplary embodiment and the first and third to seventh variations thereof, a gas adsorption unit (3) according to a sixteenth aspect may be implemented in combination with the fifteenth aspect. The gas adsorption unit (3) according to the sixteenth aspect further includes a connecting member (321). The connecting member (321) has a different thermal expansion coefficient from the package (31) and is connectible to the package (31) via the low-melting member (320).

The gas adsorption unit (3) according to the sixteenth aspect allows the connecting member (321) to be connected to the package (31) via the low-melting member (320) in the following manner, for example. First, the connecting member (321) is arranged along the package (31) via the low-melting member (320). Next, the low-melting member (320) is heated at a temperature lower than the melting point of the package (31) to be melted and cured. In this manner, the connecting member (321) is connected to the package (31) via the low-melting member (320). Thus, the gas adsorption unit (3) may be used effectively in the method for manufacturing a glass panel unit (1) according to any one of the third and sixth to thirteenth aspects and in the method for manufacturing a building component (9) according to the fourteenth aspect.

REFERENCE SIGNS LIST

1 Glass Panel Unit
10 Glass Composite
11 First Substrate
111 First Glass Pane
12 Second Substrate
121 Second Glass Pane
13 Third Substrate
134 Second Sealing Material
14 Internal Space
20 Sealing Material
3 Gas Adsorption Unit
30 Getter
31 Package
310 Notch
32 Connector
320 Low-Melting Member
321 Connecting Member
9 Building Component
90 Building Component Frame

The invention claimed is:

1. A method for manufacturing a glass panel unit, the method comprising:
an arrangement step of arranging a first substrate, including a glass pane, and a second substrate, including another glass pane, such that the first substrate and the second substrate face each other with a frame-shaped sealing material interposed between the first and second substrates, and thereby creating an internal space surrounded with the first substrate, the second substrate, and the sealing material;
a bonding step of heating a glass composite, including the first substrate, the second substrate, and the sealing material, to melt the sealing material and thereby hermetically bond the first substrate and the second substrate together with the sealing material thus melted;
an evacuating and hermetically sealing step of evacuating and hermetically sealing the internal space;
a melting step;
a curing step; and
a seal opening step,
the arrangement step including arranging a gas adsorption unit inside of the frame-shaped sealing material,
the gas adsorption unit including:
an activated getter;
a package encapsulating the getter therein; and
a low-melting member having a lower melting point than the package,
the melting step including heating, and thereby melting, the low-melting member at a temperature lower than a melting point of the package to bond a connector, including the low-melting member, onto the package,
the curing step including cooling and thereby curing, after the bonding step, the low-melting member that has melted in the melting step,
the seal opening step including causing, either during, or after, the evacuating and hermetically sealing step, thermal stress resulting from a difference in thermal expansion coefficient between the package and the connector to the package connected to the connector and breaking the package open with the thermal stress to open a seal of the getter by the package.

2. The method of claim 1, wherein
the connector includes a connecting member having a different thermal expansion coefficient from the package,
the melting step includes bonding the low-melting member to the package and the connecting member, and
the curing step includes cooling, and thereby curing, the low-melting member.

3. The method of claim 2, wherein
the gas adsorption unit includes the connecting member.
4. The method of claim 2, wherein
the connecting member is either the first substrate or the second substrate.
5. The method of claim 1, wherein
the connector consists essentially of the low-melting member.
6. The method of claim 1, wherein
the bonding step includes heating the entire glass composite at a temperature lower than the melting point of the package to melt the sealing material and the low-melting member, and
the bonding step also serves as the melting step.
7. The method of claim 1, wherein
the melting step includes heating, either during, or after, the evacuating and hermetically sealing step, the glass composite only partially and thereby heating and melting the low-melting member.
8. The method of claim 1, wherein
the seal opening step includes causing the thermal stress to the package by cooling at least one of the package or the connector.
9. The method of claim 1, wherein
the seal opening step includes causing the thermal stress to the package by heating at least one of the package or the connector.
10. The method of claim 1, wherein
the package includes either glass or a ceramic.
11. The method of claim 1, wherein
the package has a notch.
12. The method of claim 1, wherein
the getter is a non-metallic getter, and
the bonding step includes heating the glass composite at a temperature of 407° C. or less to melt the sealing material.
13. The method of claim 1, further comprising a second bonding step of bonding a third substrate to either the first substrate or the second substrate with a second sealing material in a frame shape.
14. A method for manufacturing a building component, the method comprising a fitting step of fitting a building component frame onto a glass panel unit manufactured by the method of claim 1.
15. The method of claim 2, wherein
the bonding step includes heating the entire glass composite at a temperature lower than the melting point of the package to melt the sealing material and the low-melting member, and
the bonding step also serves as the melting step.
16. The method of claim 3, wherein
the bonding step includes heating the entire glass composite at a temperature lower than the melting point of the package to melt the sealing material and the low-melting member, and
the bonding step also serves as the melting step.
17. The method of claim 4, wherein
the bonding step includes heating the entire glass composite at a temperature lower than the melting point of the package to melt the sealing material and the low-melting member, and
the bonding step also serves as the melting step.
18. The method of claim 5, wherein
the bonding step includes heating the entire glass composite at a temperature lower than the melting point of the package to melt the sealing material and the low-melting member, and
the bonding step also serves as the melting step.

* * * * *